(12) United States Patent
Watanabe et al.

(10) Patent No.: US 10,836,086 B2
(45) Date of Patent: Nov. 17, 2020

(54) INJECTION MOLDING APPARATUS

(71) Applicant: Seiko Epson Corporation, Tokyo (JP)

(72) Inventors: Yusuke Watanabe, Shiojiri (JP); Kenta Anegawa, Matsumoto (JP); Seiichiro Yamashita, Azumino (JP); Kei Yokota, Matsumoto (JP); Yuichi Sasage, Suwa (JP); Kakeru Sasagawa, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/543,916

(22) Filed: Aug. 19, 2019

(65) Prior Publication Data
US 2020/0055219 A1 Feb. 20, 2020

(30) Foreign Application Priority Data
Aug. 20, 2018 (JP) ................. 2018-153822

(51) Int. Cl.
*B29C 45/18* (2006.01)
*B29C 45/04* (2006.01)
*B29C 45/26* (2006.01)
*B29C 45/16* (2006.01)
*B29C 45/22* (2006.01)
*B29C 45/12* (2006.01)

(52) U.S. Cl.
CPC ...... *B29C 45/1866* (2013.01); *B29C 45/0441* (2013.01); *B29C 45/12* (2013.01); *B29C 45/16* (2013.01); *B29C 45/22* (2013.01); *B29C 45/2602* (2013.01)

(58) Field of Classification Search
CPC . B29C 45/1866; B29C 45/0441; B29C 45/12; B29C 45/16
See application file for complete search history.

(56) References Cited

FOREIGN PATENT DOCUMENTS

| JP | H02-023390 Y2 | 6/1990 |
|---|---|---|
| JP | H02023390 Y2 * | 6/1990 |

* cited by examiner

*Primary Examiner* — Jacob T Minskey
*Assistant Examiner* — Melody Tsui
(74) *Attorney, Agent, or Firm* — Harness, Dickey & Pierce, P.L.C.

(57) ABSTRACT

An injection molding apparatus includes a first upstream mold having a first gate opening into which a first molding material flows, a second upstream mold having a second gate opening into which a second molding material flows, a first injection unit injecting the first material through the first gate opening, a second injection unit injecting the second material through the second gate opening, and a downstream mold clampable with each of the first and second upstream molds. The second material is injected by the second injection unit after the first material is injected by the first injection unit. The second gate opening is separated further from the downstream mold than the first gate opening, and a volume of a second cavity partitioned by the second upstream mold and the downstream mold is larger than that of a first cavity partitioned by the first upstream mold and the downstream mold.

8 Claims, 16 Drawing Sheets

INJECTION MOLDING APPARATUS

The present application is based on, and claims priority from, JP Application Serial Number 2018-153822, filed Aug. 20, 2018, the disclosure of which is hereby incorporated by reference herein in its entirety.

BACKGROUND

1. Technical Field

The present disclosure relates to an injection molding apparatus.

2. Related Art

From the related art, an injection molding apparatus has been known which includes a plurality of injection units and a plurality of molds, and can perform multicolor molding by sequentially injecting a plurality of molding materials. An injection molding apparatus disclosed in JP-UM-B-2-23390 includes three injection units, three fixed units, and three movable units. Each movable unit is rotatably attached to a movable plate and is clamped with a corresponding fixed unit, so that multi-color molding is performed by injecting a molding material from the injection units.

In an injection molding apparatus disclosed in JP-UM-B-2-23390, when a molding material for the second and subsequent colors is injected, a flow channel of a gate opening is narrowed by a previously injected molding material. Thus, there is a concern that poor filling of the molding material may occur. An object of the present application is to suppress occurrence of the poor filling of the second and subsequent colors in multi-color molding using different materials.

SUMMARY

An aspect of the present disclosure provides an injection molding apparatus. The injection molding apparatus is configured to perform molding using different materials, and includes a first upstream mold having a first gate opening formed therein into which a first molding material flows, a second upstream mold having a second gate opening formed therein into which a second molding material flows, a first injection unit that injects the first molding material through the first gate opening, a second injection unit that injects the second molding material through the second gate opening, and a downstream mold configured to be clamped with each of the first upstream mold and the second upstream mold, in which the second molding material is injected by the second injection unit after the first molding material is injected by the first injection unit, the second gate opening is formed at a position separated further from the downstream mold than the first gate opening, and a volume of a second cavity partitioned by the second upstream mold and the downstream mold in a mold clamped state is larger than a volume of a first cavity partitioned by the first upstream mold and the downstream mold in the mold clamped state.

DESCRIPTION OF EXEMPLARY EMBODIMENTS

A. First Embodiment

A-1. Device Configuration

Figure 1:
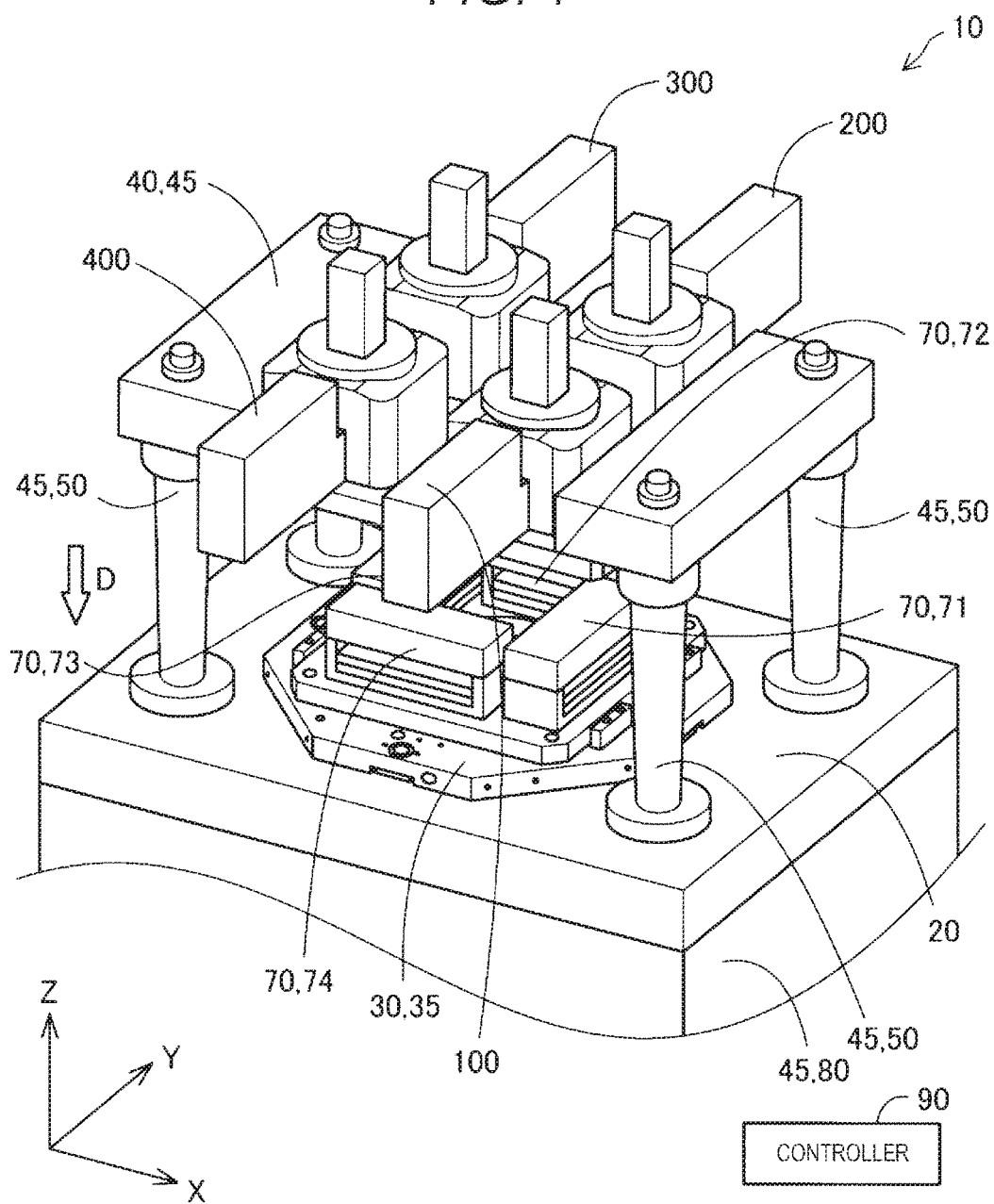
FIG. 1 is a perspective view showing a schematic configuration of an injection molding apparatus.
Figure 2:
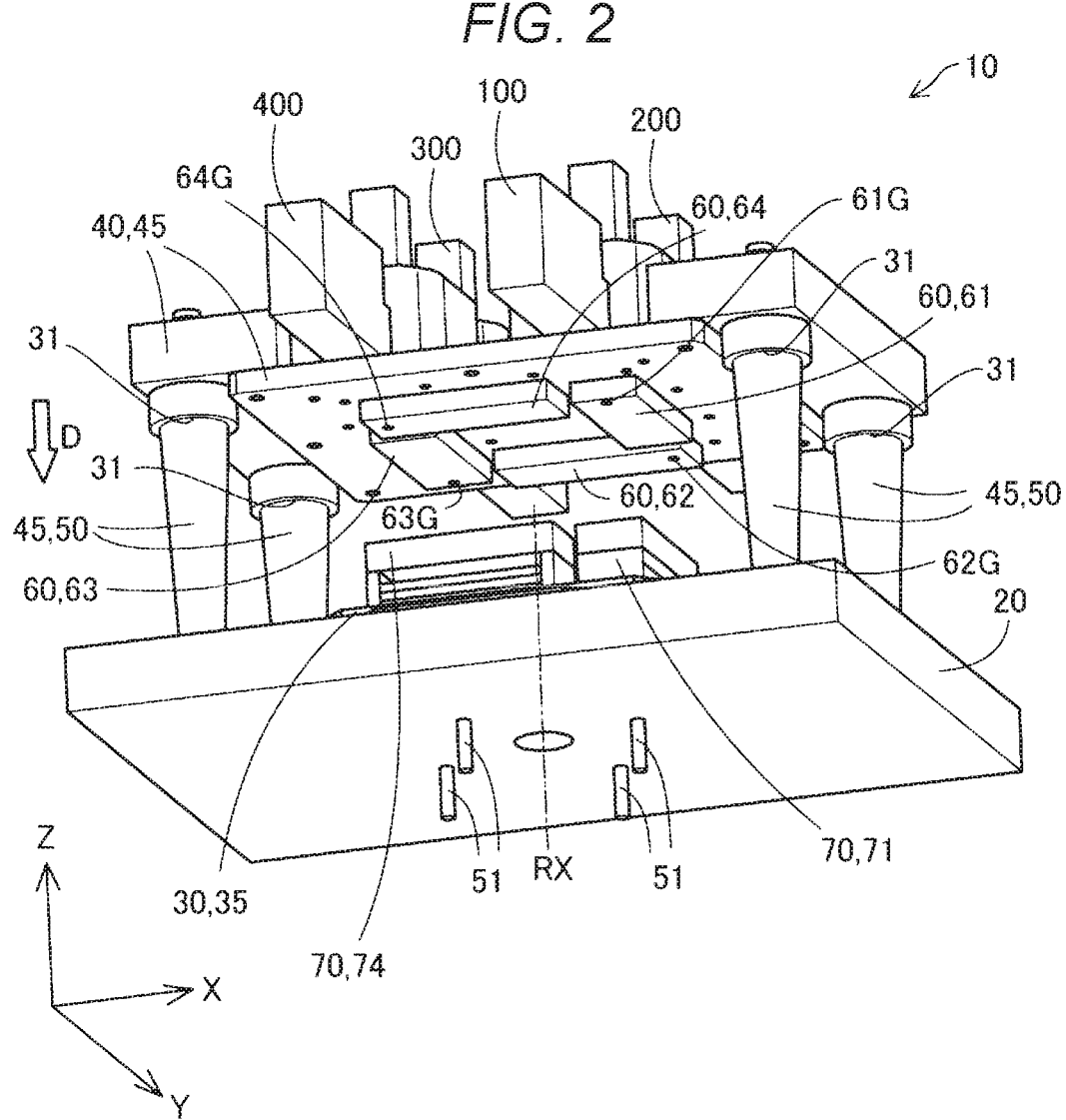
FIG. 2 is a perspective view showing a configuration located above a fixed plate when viewed from the vertically lower side.

FIG. 1 is a perspective view showing a schematic configuration of an injection molding apparatus 10 according to an embodiment of the present disclosure. FIG. 2 is a perspective view showing a configuration of the injection molding apparatus 10 located vertically above a fixed plate 20 when viewed from the vertically lower side. In FIGS. 1 and 2, the injection molding apparatus 10 in a mold opened state is shown. In FIGS. 1 and 2, an X axis, a Y axis, and a Z axis are shown which are perpendicular to each other, and a +Z direction corresponds to a vertically upward direction. The X axis, the Y axis, and the Z axis of FIGS. 1 and 2 correspond to an X axis, a Y axis, and a Z axis of the other drawings, respectively.

The injection molding apparatus 10 performs multi-color molding by sequentially injecting a plurality of molding materials, to produce a molded product. The injection molding apparatus 10 according to the present embodiment includes four injection units 100, 200, 300, and 400, and performs the multi-color molding using four molding materials that are different from each other. The multi-color molding is not limited to injection molding using molding materials having colors that are different from each other, and also includes injection molding using different materials, that is, different types of materials. Detailed description of each molding material will be made below. The injection molding apparatus 10 is placed on a surface that is parallel to an XY plane.

In the following description, injection by the first injection unit 100 is also called a "first injection", injection by the second injection unit 200 is also called a "second injection", injection by the third injection unit 300 is also called a "third injection", and injection by the fourth injection unit 400 is also called a "fourth injection". The second injection is performed after the first injection, the third injection is performed after the second injection, and the fourth injection is performed after the third injection, so that a molded product is completed.

The injection molding apparatus 10 includes the fixed plate 20, a rotary plate 30, a movable plate 40, four tie bars 50, an upstream mold 60 (hereinafter, also called an "upper mold 60"), a downstream mold 70 (hereinafter, also called a "lower mold 70"), a mold clamping device 80, a controller 90, a first injection unit 100, a second injection unit 200, a third injection unit 300, a fourth injection unit 400, and a spacer, which will be described below. In the injection molding apparatus 10 according to the present embodiment, the injection units 100, 200, 300, and 400 and the upper mold 60 are fixed to the movable plate 40 moving along an injection direction D for clamping, and the lower mold 70 is fixed to the rotary plate 30 provided on the fixed plate 20 and rotating about a rotational axis RX that is parallel to the injection direction D. In the present embodiment, the injection direction D coincides with a vertically downward direction.

The fixed plate 20 is disposed in parallel to the XY plane and has a substantially rectangular plate-like outer appearance. The rotary plate 30 is disposed substantially at the center of the upper surface of the fixed plate 20 in a vertical direction. The rotary plate 30 has a substantially octagonal plate-like outer appearance. The rotary plate 30 has the rotational axis RX that is parallel to the injection direction D, and rotates about the rotational axis RX. The rotary plate 30 is connected to a not-shown rotary plate motor and is rotated by a rotational driving force generated by the rotary plate motor. The rotary plate motor is driven under a control of the controller 90. The lower mold 70 is disposed on an upper surface of the rotary plate 30 in the vertical direction. The lower mold 70 will be described below. The rotary plate 30 and the rotary plate motor constitute a position changing mechanism 35. The position changing mechanism 35 changes a relative position between the upper mold 60 and the lower mold 70 in a direction intersecting the injection direction D to cause the upper mold 60 and the lower mold 70 selectively face each other.

The movable plate 40 is disposed in parallel to the XY plane and moves along the injection direction D when the upper mold 60 and the lower mold 70 are closed and opened. The movable plate 40 has an outer appearance obtained by adding a flat plate member having a rectangular shape in plan view to the outside of end portions of a thin plate member in a +X direction and a −X direction and is formed with connection ports 31 at four corners. The four connection ports 31 are formed to penetrate the movable plate 40 along the injection direction D, and the tie bars 50 are inserted into the connection ports 31, respectively. The four tie bars 50 function as a support for moving the movable plate 40 along the injection direction D. An end portion of each of the tie bars 50 on a vertically lower side is fixed to the fixed plate 20. The movable plate 40 and the four tie bars 50 constitute a mold clamping mechanism 45 together with a mold opening and closing motor of the mold clamping device 80, which will be described below. The mold clamping mechanism 45 changes the relative position between the upper mold 60 and the lower mold 70 in the injection direction D, and clamps the upper mold 60 and the lower mold 70.

Figure 10:
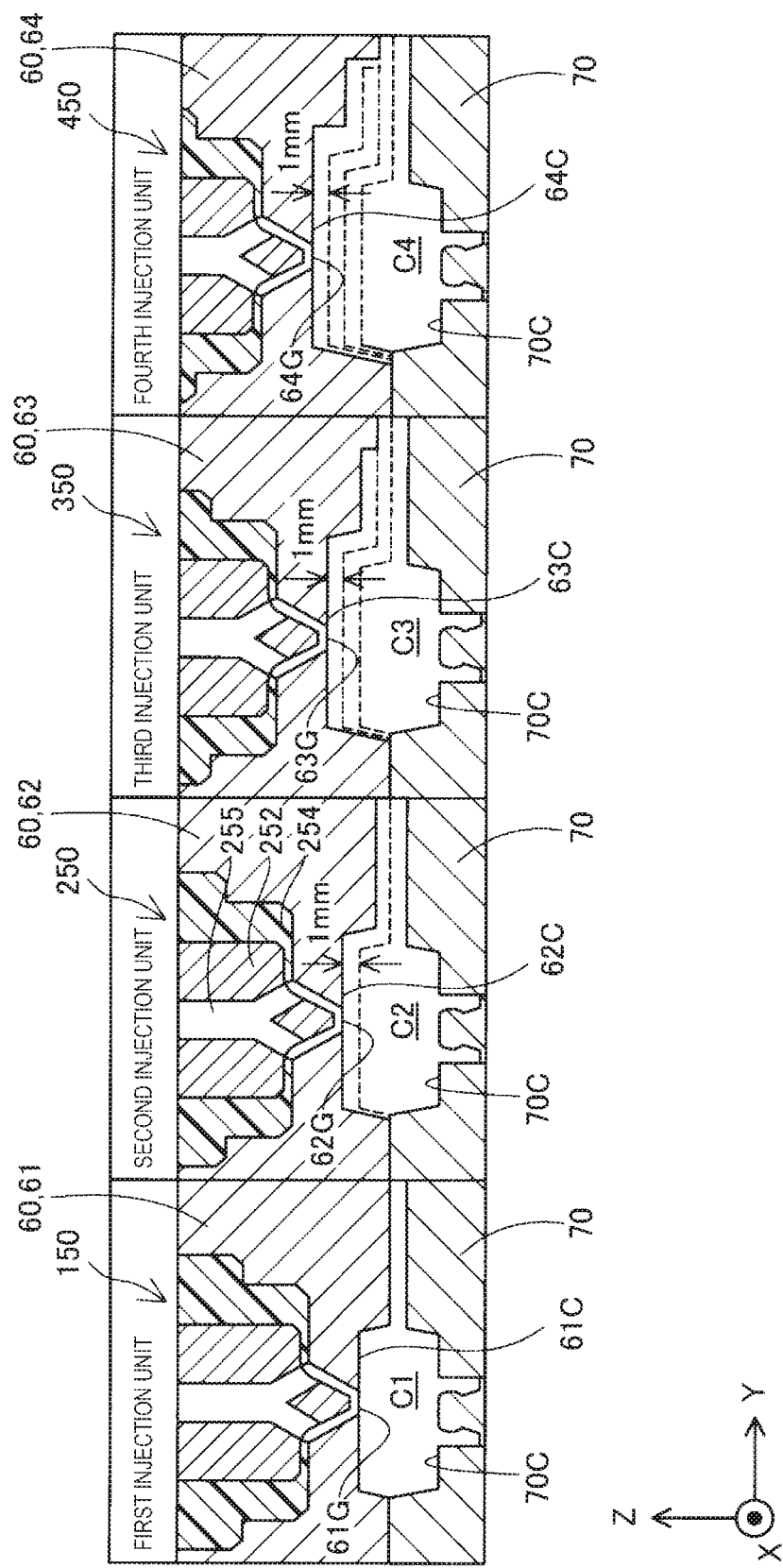
FIG. 10 is an explanatory view for illustrating positions of each nozzle and each gate opening in an injection direction.

The upper mold 60 is disposed on a lower surface of the movable plate 40 in the vertical direction. The upper mold 60 and the lower mold 70 are configured to be able to be clamped. In a state in which the upper mold 60 and the lower mold 70 are clamped, a space interposed between and defined by the upper mold 60 and the lower mold 70 functions as a cavity filled with the molding material. A structure of such a cavity is represented in FIG. 10, which will be described below. In the present embodiment, the upper mold 60 and the lower mold 70 are configured as disposable molds.

The upper mold 60 has a first upstream mold 61 (hereinafter, also referred to as a "first upper mold 61"), a second upstream mold 62 (hereinafter, also referred to as a "second upper mold 62"), a third upstream mold 63 (hereinafter, also referred to as a "third upper mold 63"), and a fourth upstream mold 64 (hereinafter, also referred to as a "fourth upper mold 64"). The first upper mold 61 is disposed at a position corresponding to the first injection unit 100. The second upper mold 62 is disposed at a position corresponding to the second injection unit 200. The third upper mold 63 is disposed at a position corresponding to the third injection unit 300. The fourth upper mold 64 is disposed at a position corresponding to the fourth injection unit 400. Gate openings 61G, 62G, 63G, and 64G through which the molding material flows are formed in the upper molds 61, 62, 63, and 64, respectively. Each of the gate openings 61G, 62G, 63G, and 64G is configured by a substantially circular hole. In the present embodiment, the areas of the gate openings 61G, 62G, 63G, and 64G are equal to each other. As will be described below, the positions of the gate openings 61G, 62G, 63G, and 64G along the injection direction D are different from each other. Further, the upper molds 61, 62, 63, and 64 communicate with the gate openings 61G, 62G, 63G, and 64G, respectively, and have upper mold cavities 61C, 62C, 63C, and 64C, respectively. In FIG. 2, the upper mold cavities 61C, 62C, 63C, and 64C are not shown. The first upper mold cavity 61C is formed based on the shape of a molded intermediate product molded by the first injection. The second upper mold cavity 62C is formed based on the shape of a molded intermediate product molded by the second injection performed after the first injection. The third upper mold cavity 63C is formed based on the shape of a molded intermediate product molded by the third injection performed after the second injection. The fourth upper mold cavity 64C is formed based on the shape of a molded intermediate product molded by the fourth injection performed after the third injection.

Figure 3:
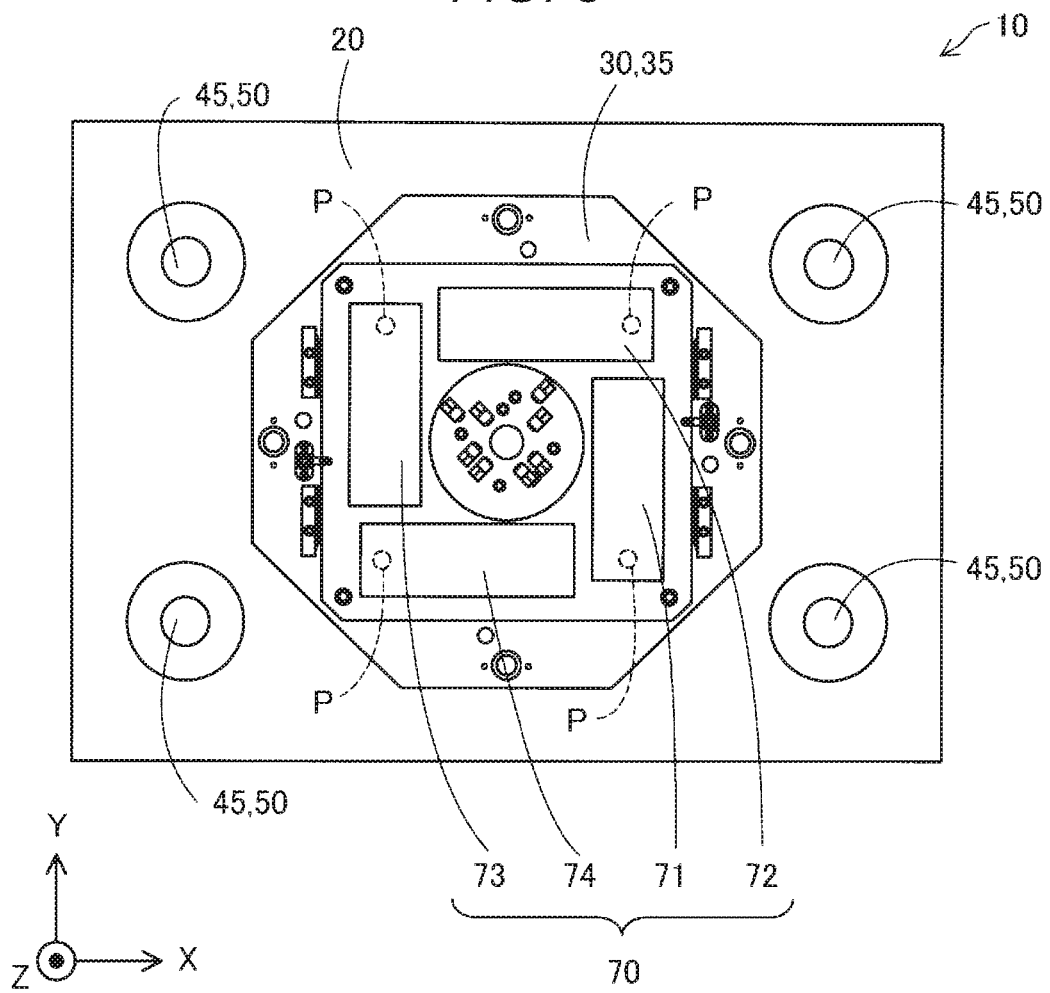
FIG. 3 is an explanatory view for illustrating an arrangement configuration of a lower mold.

FIG. 3 is a diagram for illustrating an arrangement configuration of the lower mold 70. FIG. 3 is a top view of the fixed plate 20 when viewed from the vertically upper side. The lower mold 70 has a first downstream mold 71 (hereinafter, also referred to as a "first lower mold"), a second downstream mold 72 (hereinafter, also referred to as a "second lower mold 72"), a third downstream mold 73 (hereinafter, also referred to as a "third lower mold 73"), and a fourth downstream mold 74 (hereinafter, also referred to as a "fourth lower mold 74"). As illustrated in FIGS. 1 and 2, the lower mold 70 is disposed on the rotary plate 30, and thus moves about the rotational axis RX of the rotary plate 30 along a direction that is perpendicular to the injection direction D upon rotation of the rotary plate 30. Accordingly, the lower molds 71, 72, 73, and 74 selectively correspond to the upper molds 61, 62, 63, and 64, respectively, such that the lower molds 71, 72, 73, and 74 and the upper molds 61, 62, 63, and 64 are located at a mold-clampable position. The lower molds 71, 72, 73, and 74 have the same configuration, and are arranged in a state in which the lower molds 71, 72, 73, and 74 are rotated with respect to adjacent ones by 90° in the XY plane. A lower mold cavity 70C is formed in each of the lower molds 71, 72, 73, and 74. In FIGS. 1 to 3, the lower mold cavity 70C is not shown. The lower mold cavity 70C is formed based on the shape of the molded product.

In FIG. 3, for convenience of description, in the lower mold 70, facing positions P that are positions facing the gate openings 61G, 62G, 63G, and 64G shown in FIG. 2 are indicated by broken circles, respectively. The lower molds 71, 72, 73, and 74 face the gate openings 61G, 62G, 63G, and 64G at the facing positions P. Therefore, for example, in the first lower mold 71, the facing position P facing the first gate opening 61G when the first upper mold 61 is clamped, the facing position P facing the second gate opening 62G when the second upper mold 62 is clamped, the facing position P facing the third gate opening 63G when the third upper mold 63 is clamped, and the facing position P facing the fourth gate opening 64G when the fourth upper mold 64 is clamped are all the same. The facing positions P where the lower molds 71, 72, 73, and 74 face the gate openings 61G, 62G, 63G, and 64G, respectively, are not limited to the same or the facing positions P may be different from each other with respect to the gate openings 61G, 62G, 63G, and 64G.

In the upper mold 60 and the lower mold 70, a not-shown refrigerant flow path is formed. As a coolant such as cooling water flows through a coolant channel, the temperature of the upper mold 60 and the lower mold 70 is maintained lower than a melting temperature, and the injected molding material is cooled and hardened. The refrigerant flows at a time of mold clamping and at a time of mold opening. The cooling and hardening of the molding material may be realized using any cooling means such as a Peltier element instead of causing the refrigerant to flow in the refrigerant flow path.

As the movable plate 40 moves along the injection direction D, the mold clamping device 80 shown in FIG. 1 opens and closes the upper mold 60 and the lower mold 70. That is, the mold clamping device 80 closes the upper mold 60 and the lower mold 70, and executes the mold clamping and the mold opening. The mold clamping device 80 has a not-shown mold opening and closing motor and four extrusion pins 51 shown in FIG. 2. The mold opening and closing motor is driven under a control of the controller 90 to move the movable plate 40 along the injection direction D. The four extrusion pins 51 are disposed at positions communicating with the lower mold cavities 70C formed in the lower molds 71, 72, 73, and 74, respectively. The extrusion pins 51 release the molded product by extruding the molded product at the time of the mold opening by the driving force of the mold opening and closing motor. The extrusion pins 51 are driven independently.

The controller 90 shown in FIG. 1 controls the overall operation of the injection molding apparatus 10 to perform multi-color molding. In the present embodiment, the controller 90 is configured with a computer including one or more processors and a main storage device. The controller 90 performs various functions by the processors executing programs and instructions read to the main storage device. The controller 90 may be realized by a configuration obtained by combining a plurality of circuits for realizing functions instead of such a computer. The controller 90 outputs control instructions to the rotary plate motor, the mold opening and closing motor, and the injection units 100, 200, 300, and 400.

Figure 4:
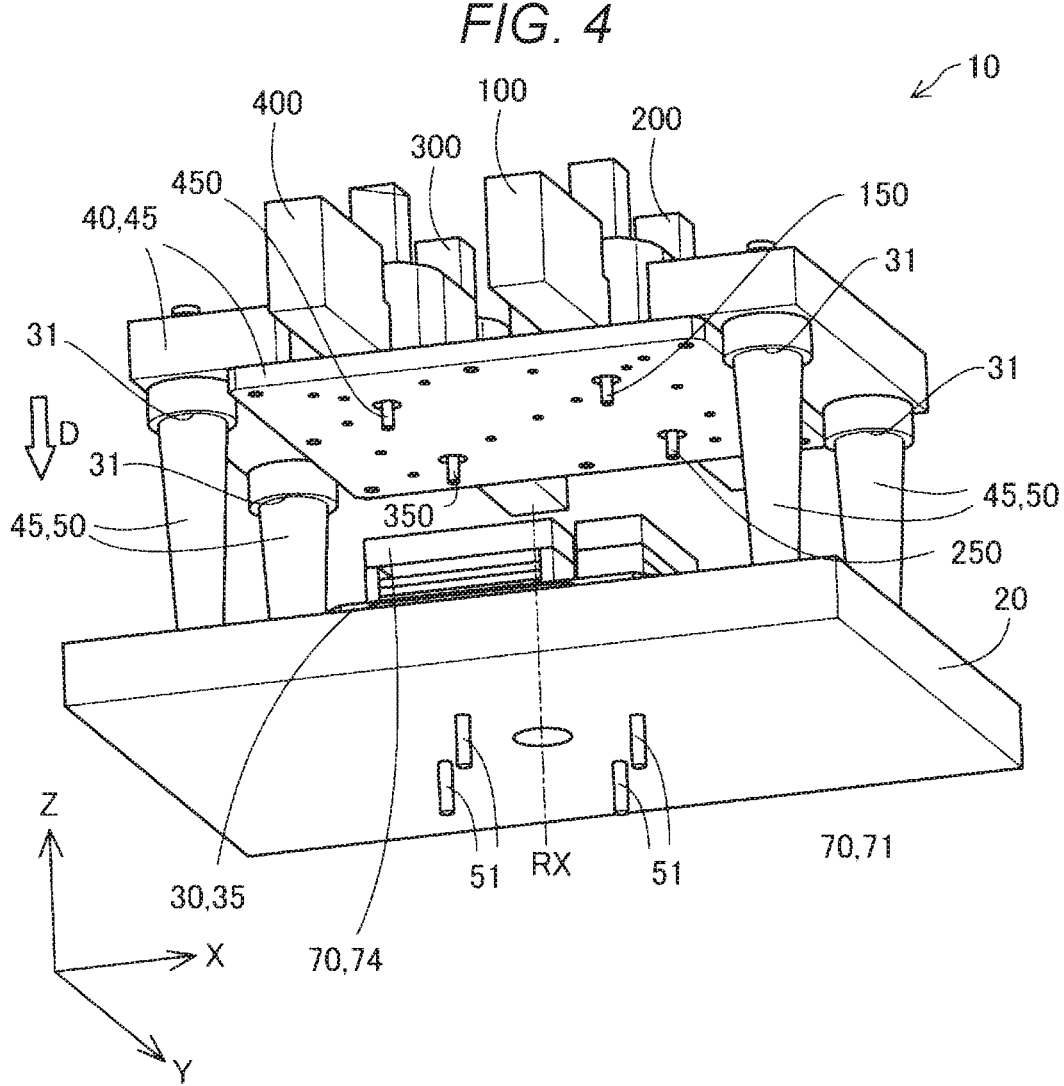
FIG. 4 is a perspective view showing the injection molding apparatus in a state in which an upper mold is removed.

FIG. 4 is a perspective view showing the injection molding apparatus 10 in a state in which the upper mold 60 is removed. In FIG. 4, the injection molding apparatus 10 is shown when viewed from the same direction as FIG. 2. The first injection unit 100 injects a first molding material through the first gate opening 61G from a first nozzle 150 disposed inside the first upper mold 61. The second injection unit 200 injects a second molding material through the second gate opening 62G from a second nozzle 250 disposed inside the second upper mold 62. The third injection unit 300 injects a third molding material through the third gate opening 63G from a third nozzle 350 disposed inside the third upper mold 63. The fourth injection unit 400 injects a fourth molding material through the fourth gate opening 64G from a fourth nozzle 450 disposed inside the fourth upper mold 64.

The four injection units 100, 200, 300, and 400 have the same configuration except for the positions of the nozzles 150, 250, 350, and 450 along the injection direction D. In more detail, a spacer, which will be described below, is not disposed in the first injection unit 100, and spacers are disposed in the other three injection units 200, 300, and 400. Therefore, hereinafter, the second injection unit 200 will be described in detail. In the first injection unit 100, the third injection unit 300, and the fourth injection unit 400, the same components as the second injection unit 200 are designated by the same reference numerals, and detailed description thereof will be omitted suitably. The injection directions D of the injection units 100, 200, 300, and 400 are parallel to each other.

Figure 5:
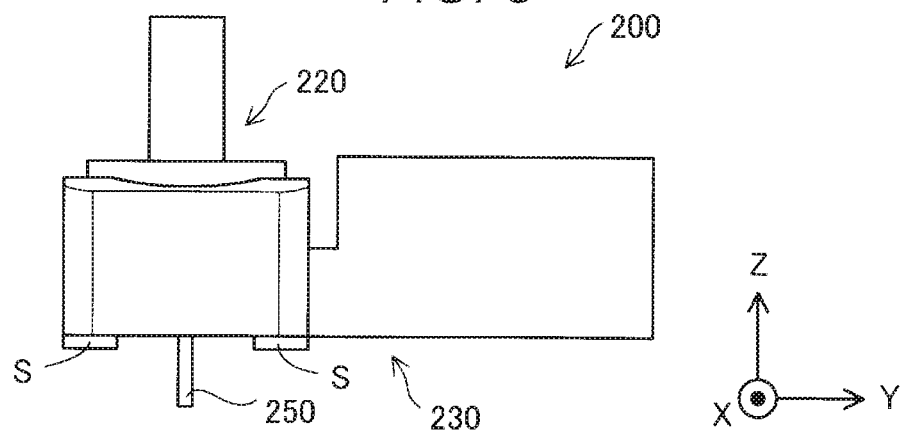
FIG. 5 is a front view showing a schematic configuration of a second injection unit.
Figure 6:
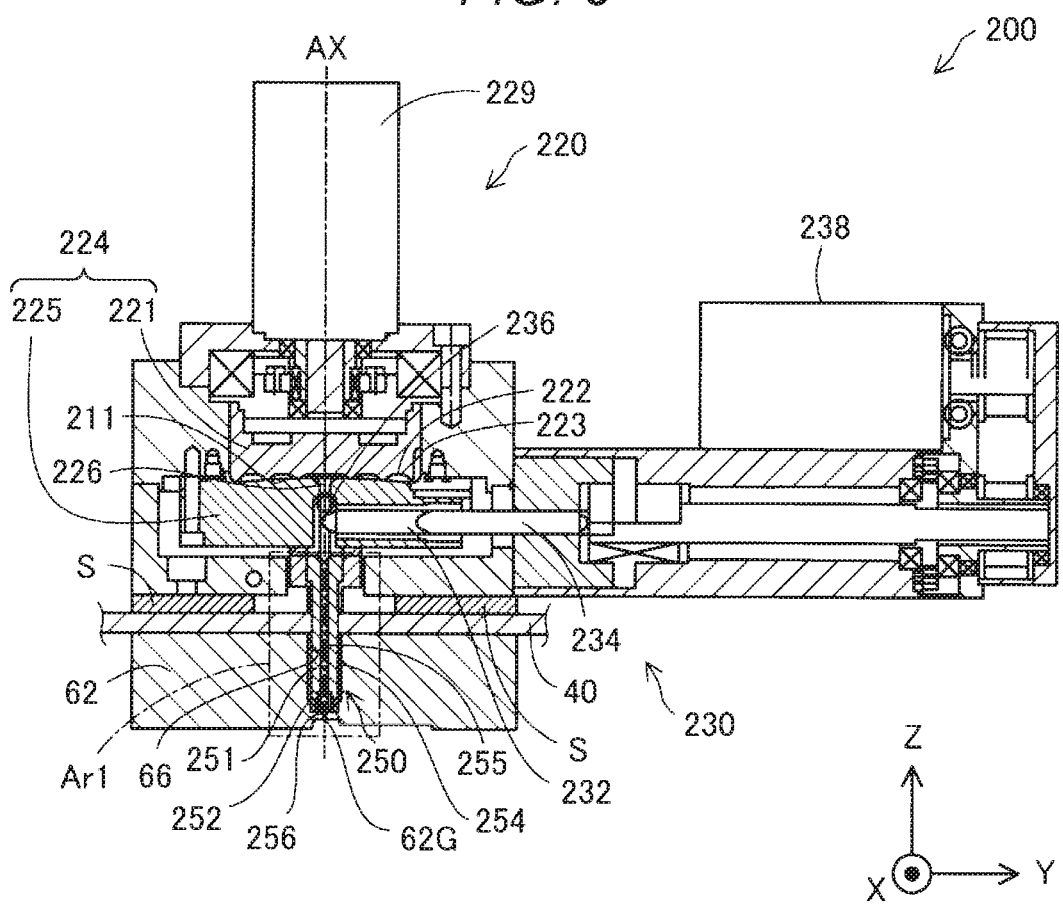
FIG. 6 is a sectional view showing a schematic configuration of the second injection unit.

FIG. 5 is a front view showing a schematic configuration of the second injection unit 200. FIG. 6 is a sectional view showing a detailed configuration of the second injection unit 200. FIG. 6 shows a cross section obtained by cutting the second injection unit 200 along a vertical direction, in the cross section including an axial line AX of the second nozzle 250. In FIG. 6, for convenience of description, the movable plate 40 and the second upper mold 62 are shown together with the second injection unit 200. The second injection unit 200 includes a material generating unit 220 and an injection unit 230.

The material generating unit 220 generates the second molding material having fluidity by plasticizing and melting at least a part of a solid material supplied from a not-shown hopper disposed on the vertically upper side, and supplies the second molding material to the injection unit 230 side. Such a solid material is inserted into the hopper in various granular forms such as pellets and powders. As illustrated in FIG. 6, the material generating unit 220 has a flat screw 224 and a driving motor 229.

The flat screw 224 has a scroll 221 and a barrel 225. The scroll 221 has a substantially cylindrical external shape of which the length along the axial line AX is smaller than the diameter thereof. The scroll 221 is disposed such that the axial line AX of the second nozzle 250 and the axial line AX of the scroll 221 coincide with each other. A groove portion 222 is formed on an end surface 211 of the scroll 221, facing the barrel 225, and a material inlet 223 is formed on an outer peripheral surface of the scroll 221. The groove portion 222 is connected to the material inlet 223. The material inlet 223 receives a solid material supplied from the hopper.

Figure 7:
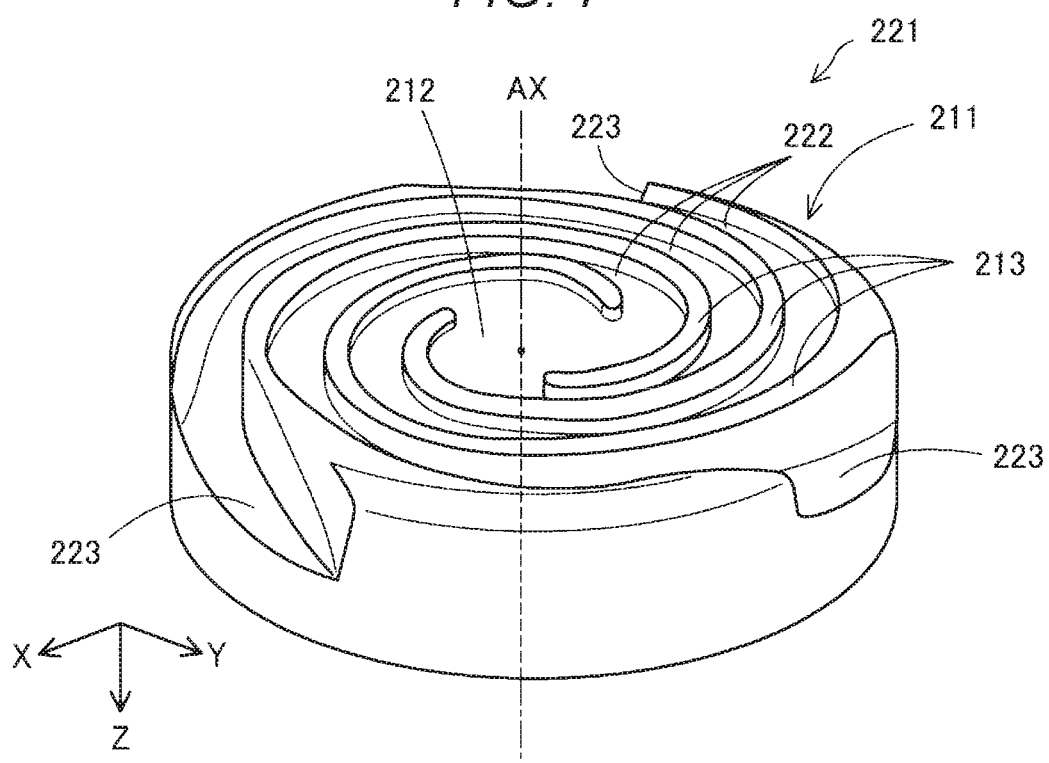
FIG. 7 is a schematic perspective view showing a configuration of an end surface of a scroll.

FIG. 7 is a schematic perspective view showing a configuration of the end surface 211 of the scroll 221. A central portion 212 of the end surface 211 of the scroll 221 is configured as a recess portion to which one end of the groove portion 222 is connected. The central portion 212 faces a through-hole 226 of the barrel 225 shown in FIG. 6. In the present embodiment, the central portion 212 intersects the axial line AX. The groove portion 222 of the scroll 221 is configured by a so-called scroll groove and is formed in a spiral shape to draw an arc from the central portion where the axial line AX is located to the outer peripheral surface side of the scroll 221. The groove portion 222 may be configured in a spiral shape. The end surface 211 is provided with a protrusion ridge portion 213 that constitutes a side wall portion of the groove portion 222 and extends along the groove portion 222.

Although three groove portions 222 and three protrusion ridge portions 213 are formed on the end surface 211 of the scroll 221 according to the present embodiment, the number is not limited to three, and one or more groove portions 222 and one or more protrusion ridge portions 213 may be formed. Further, the predetermined number of the ridge portions 213 is provided according to the number of the groove portions 222. Further, three material inlets 223 are formed on the outer peripheral surface of the scroll 221 according to the present embodiment along a circumferential direction at regular intervals. The number is not limited to three, and one or more material inlets 223 may be formed or may be formed not only at regular intervals but also at different intervals.

The barrel 225 shown in FIG. 6 has a substantially disc-like outer appearance and is disposed to face the end surface 211 of the scroll 221. The barrel 225 is embedded with a not-shown heating member for heating a material. The barrel 225 is formed with a through-hole 226 penetrated along the axial line AX. The through-hole 226 functions as a channel through which the molding material is guided to the second nozzle 250. The barrel 225 is formed with an injection cylinder 232 penetrated along an axis that is perpendicular to the axial line AX. The injection cylinder 232 constitutes a part of the injection unit 230 and communicates with the through-hole 226.

Figure 8:
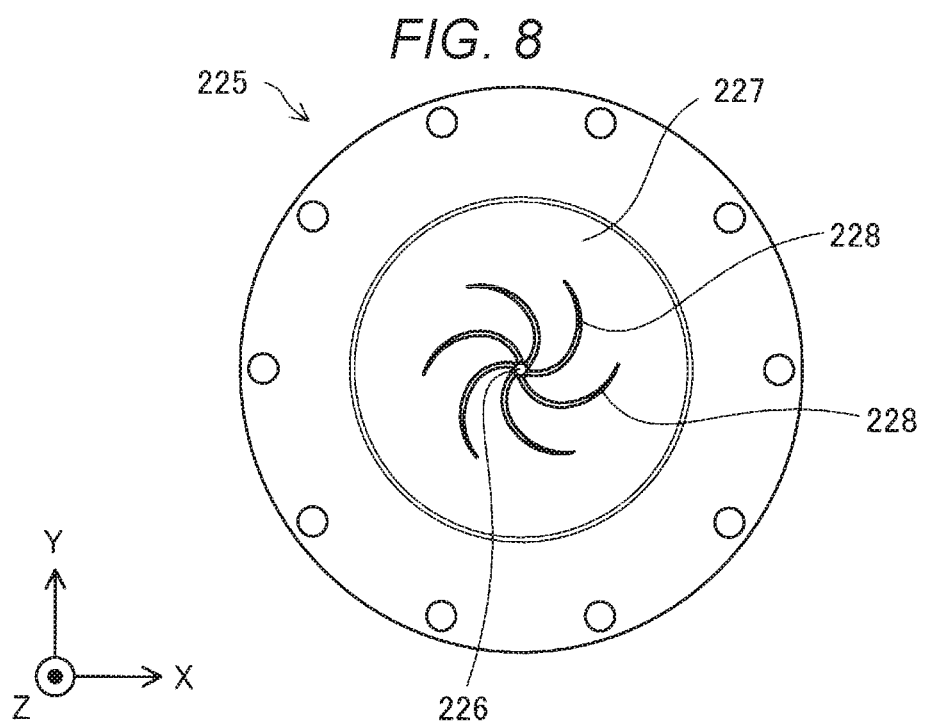
FIG. 8 is a schematic plan view showing a configuration of a barrel.

FIG. 8 is a schematic plan view showing a configuration of the barrel 225. In FIG. 8, a scroll facing surface 227 disposed to face the end surface 211 of the scroll 221 among the barrel 225 is shown. The through-hole 226 is formed at the center of the scroll facing surface 227. A plurality of guide grooves 228 connected to the through-hole 226 and extending spirally from the through-hole 226 toward an outer periphery are formed in the scroll facing surface 227. The plurality of guide grooves 228 function to guide the molding material flowing in the central portion 212 of the scroll 221 to the through-hole 226.

The driving motor 229 shown in FIG. 6 is connected to an end surface of the scroll 221 on an opposite side to a side facing the barrel 225. The driving motor 229 is driven in response to an instruction from the controller 90 shown in FIG. 1 to rotate the scroll 221 with the axial line AX as a rotational axis.

While at least a part of the material supplied from the material inlet 223 is heated by the heating member of the barrel 225 inside the groove portion 222 of the scroll 221, the at least a part of the material is plasticized and melted by rotation of the scroll 221, is transported while fluidity thereof increases, and is guided to the through-hole 226. Compression and degassing of the second molding material is realized by the rotation of the scroll 221.

The injection unit 230 weights the second molding material supplied from the material generating unit 220 and injects the second molding material to a space defined by the second upper mold 62 and the lower mold 70 in a mold clamped state. The injection unit 230 has the injection cylinder 232, an injection plunger 234, a check valve 236, an injection motor 238, and a second nozzle 250.

The injection cylinder 232 is formed in a substantially cylindrical shape inside the barrel 225 and communicates with the through-hole 226. The injection plunger 234 is slidably disposed inside the injection cylinder 232. As the injection plunger 234 slides on an opposite side to the through-hole 226 side, the molding material inside the through-hole 226 is drawn into the injection cylinder 232 and is measured. As the injection plunger 234 slides toward the through-hole 226, the second molding material inside the injection cylinder 232 is transferred to the second nozzle 250 side, and is injected into the space defined by the second upper mold 62 and the lower mold 70. The check valve 236 is disposed inside the through-hole 226 on the scroll 221 side from a communication point between the injection cylinder 232 and the through-hole 226. The check valve 236 allows flow of the second molding material from the scroll 221 side to the second nozzle 250 side, and suppresses backflow of the second molding material from the second nozzle 250 side to the scroll 221 side. When the injection plunger 234 slides toward the through-hole 226, a spherical valve body of the check valve 236 moves toward the scroll 221 to close the through-hole 226. The injection motor 238 is driven in response to an instruction from the controller 90 shown in FIG. 1 to cause the injection plunger 234 to slide in the injection cylinder 232. A sliding speed and a sliding amount of the injection plunger 234 are preset according to the type, the filling amount, and the like of the second molding material.

The second nozzle 250 is configured by a so-called hot runner. The second nozzle 250 is disposed inside the second upper mold 62, and guides the second molding material to the second gate opening 62G formed in the second upper mold 62 in a state in which the second molding material is heated. The second nozzle 250 is disposed in a nozzle attachment hole 66 penetrated along the axial line AX formed in the second upper mold 62. The second nozzle 250 has a main body portion 251, a chip 252, and a heat insulating portion 254.

Figure 9:
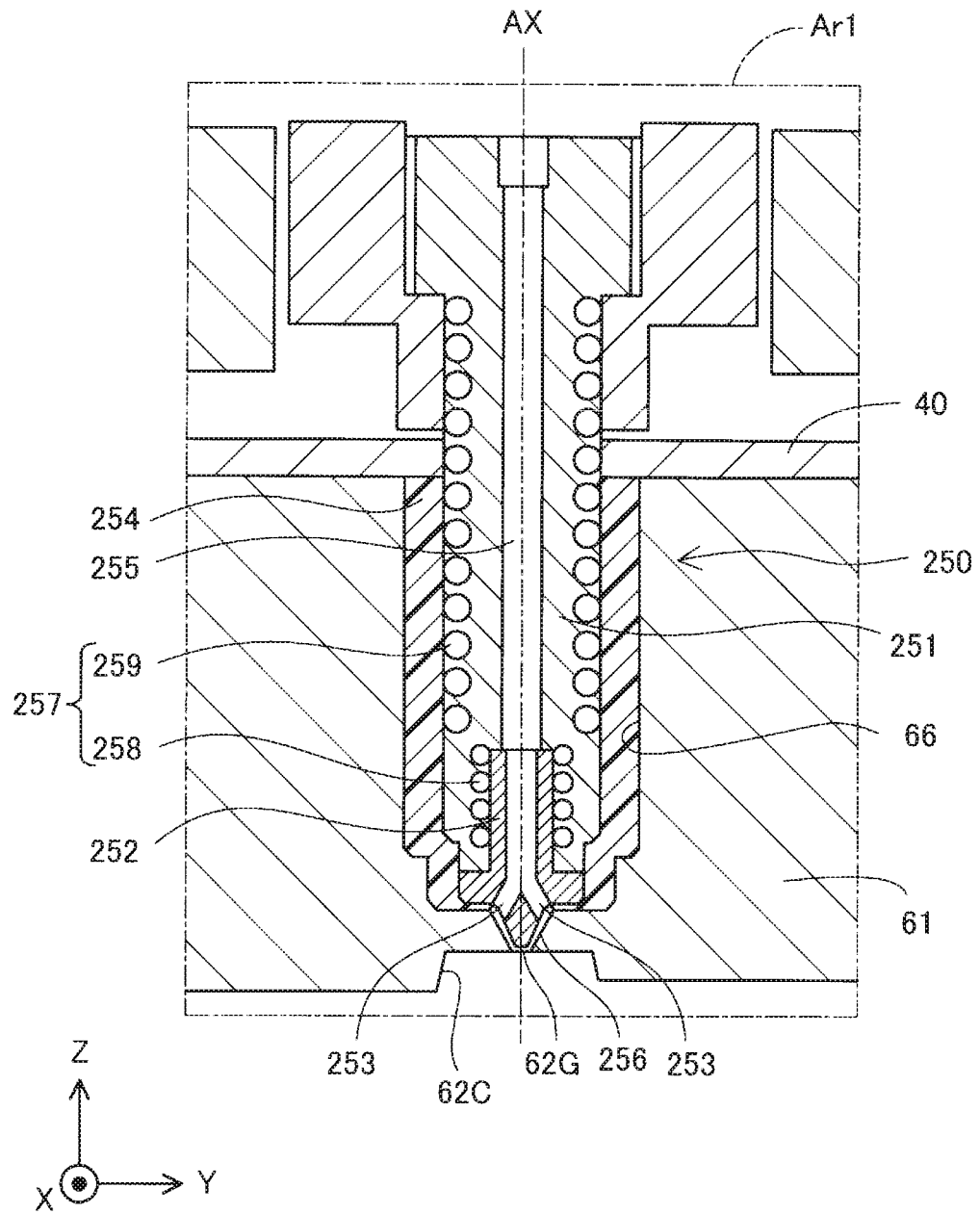
FIG. 9 is an enlarged sectional view showing an area Ar1 of FIG. 6 in an enlarged manner.

FIG. 9 is an enlarged sectional view showing an area Ar1 of FIG. 6 in an enlarged manner. The main body portion 251 has a substantially cylindrical external shape. The chip 252 is fixedly disposed at an end portion of the second nozzle 250 on the second gate opening 62G side to function as a tip end portion 256 of the second nozzle 250. The tip end portion 256 has a substantially conical external shape protruding toward the second gate opening 62G. A flow channel 255 along the axis AX is formed inside the main body portion 251 and inside the chip 252. The flow channel 255 functions to guide the second molding material to the second gate opening 62G. The flow channel 255 branches at a not-shown nozzle port 253 formed in the tip end portion 256. The nozzle port 253 is opposite to an end portion of the nozzle attachment hole 66 on the cavity side. In the present embodiment, two nozzle ports 253 arranged in a circumferential direction at regular intervals are formed at the tip end portion 256. However, the number is not limited to two, and four or more nozzle ports 253 may be formed. In such a structure, the second gate opening 62G has an open gate structure also called a so-called ring gate. The flow channel 255 is not blocked even when the second molding material is hardened and is always in an open state.

A heater 257 is embedded in the main body portion 251. The heater 257 is configured with a coil heater and heats the second molding material by heating the second nozzle 250 under a control of the controller 90. By such heating, the second molding material flowing in the flow channel 255 is maintained in a molten state. In the present embodiment, the heater 257 includes a chip heater 258 and a nozzle heater 259. The chip heater 258 is disposed to surround the chip 252. The nozzle heater 259 is disposed upstream of the chip heater 258. The heater 257 is not limited to the two members including the chip heater 258 and the nozzle heater 259, and may be a single member heater. Further, the heater 257 is not limited to the coil heater, and may be configured by an arbitrary heater such as a band heater.

The heat insulating portion 254 is located in a gap between the second nozzle 250 and the nozzle attachment hole 66. The heat insulating portion 254 suppresses transfer of heat of the second nozzle 250 to the second upper mold 62. In the present embodiment, the heat insulating portion 254 is formed of the same resin material as the second molding material. However, the heat insulating portion 254 may be formed of a predetermined material having a relatively low thermal conductivity or may be realized by a space.

The spacer S shown in FIGS. 5 and 6 is a member for adjusting the positions of the nozzles 150, 250, 350, and 450 along the injection direction D. The spacer S has a flat ring-like external appearance. The spacer S is disposed to surround the nozzles 250, 350, and 450 between the second injection unit 200 and the movable plate 40, between the third injection unit 300 and the movable plate 40, and between the fourth injection unit 400 and the movable plate 40. The spacer S is not disposed between the first injection unit 100 and the movable plate 40. In the present embodiment, the thickness of the spacer S disposed between the second injection unit 200 and the movable plate 40 in the injection direction D is about 1 mm. Further, the thickness of the spacer S disposed between the third injection unit 300 and the movable plate 40 in the injection direction D is about 2 mm. Further, the thickness of the spacer S disposed between the fourth injection unit 400 and the movable plate 40 in the injection direction D is about 3 mm. As the spacers S are interposed between the respective injection units 200, 300, and 400, and the movable plate 40, the injection units 200, 300, and 400 and the nozzles 250, 350, and 450 used for subsequent injection are located upstream of the injection units 200, 300, and 400 and the nozzles 250, 350, and 450 used for previous injection in the injection direction D, in other words, are located on a side separated from the lower mold 70.

FIG. 10 is a diagram for illustrating the positions of the respective nozzles 150, 250, 350, and 450 and the respective gate openings 61G, 62G, 63G, and 64G along the injection direction D. In FIG. 10, peripheral portions of the respective nozzles 150, 250, 350, and 450 and the gate openings 61G, 62G, 63G, and 64G corresponding to the respective injection units 100, 200, 300, and 400 are shown in a cross section similar to FIG. 6 in an enlarged manner. In FIG. 10, for reference, positions of the upper mold cavities 61C, 62C, and 63C of the upper molds 61, 62, and 63 used for the previous injection are shown by broken lines.

In the present embodiment, the second nozzle 250 of the second injection unit 200 is located upstream of the first nozzle 150 of the first injection unit 100 in the injection direction D by about 1 mm. Further, the third nozzle 350 of the third injection unit 300 is located upstream of the second nozzle 250 of the second injection unit 200 in the injection direction D by about 1 mm. Further, the fourth nozzle 450 of the fourth injection unit 400 is located upstream of the third nozzle 350 of the third injection unit 300 in the injection direction D by about 1 mm.

The respective gate openings 61G, 62G, 63G, and 64G and the respective upper mold cavities 61C, 62C, 63C, and 64C of the respective upper molds 61, 62, 63, and 64 are designed in advance to correspond to the positions of the respective nozzles 150, 250, 350, and 450. Therefore, the second gate opening 62G of the second upper mold 62 is located upstream of the first gate opening 61G of the first upper mold 61 in the injection direction D by about 1 mm. Further, the third gate opening 63G of the third upper mold 63 is located upstream of the second gate opening 62G of the second upper mold 62 in the injection direction D by about 1 mm. Further, the fourth gate opening 64G of the fourth upper mold 64 is located upstream of the third gate opening 63G of the third upper mold 63 in the injection direction D by about 1 mm. However, the gate openings 62G, 63G, and 64G used for the subsequent injection are located upstream of the gate openings 61G, 62G, and 63G used for the previous injection in the injection direction D, in other words, are formed at positions separated from the lower mold 70.

Further, the volume of the second cavity C2 partitioned by the second upper mold 62 of the second injection unit 200 and the lower mold 70 is larger than the volume of the first cavity C1 partitioned by the first upper mold 61 of the first injection unit 100 and the lower mold 70. The second cavity C2 corresponds to a space formed by the second upper mold cavity 62C and the lower mold cavity 70C, and the first cavity C1 corresponds to a space formed by the first upper mold cavity 61C and the lower mold cavity 70C. Similarly, the volume of the third cavity C3 partitioned by the third upper mold 63 and the lower mold 70 is larger than the volume of the second cavity C2 partitioned by the second upper mold 62 and the lower mold 70. Further, the volume of the fourth cavity C4 partitioned by the fourth upper mold 64 and the lower mold 70 is larger than the volume of the third cavity C3 partitioned by the third upper mold 63 and the lower mold 70.

As the injection molding apparatus 10 according to the present embodiment includes a configuration shown in FIG. 10, among four times of injection of four-color molding, the subsequent injection can be performed upstream of the previous injection in the injection direction D. Accordingly, it is suppressed that flow channels of the respective gate openings 62G, 63G, and 64G are narrowed by the molding material injected by the previous injection, and it is suppressed that poor filling of the molding material in the subsequent injection is generated.

In the present embodiment, the heater 257 of the first nozzle 150 corresponds to a subordinate concept of the first heater in the present disclosure, and the heater 257 of the second nozzle 250 corresponds to a subordinate concept of the second heater in the present disclosure. Further, the flat screw 224 of the first injection unit 100 corresponds to a subordinate concept of the first flat screw in the present disclosure, and the flat screw 224 of the second injection unit 200 corresponds to a subordinate concept of the second flat screw in the present disclosure.

A-2. Injection Molding Material

A material used in the injection molding apparatus 10 will be described. In the injection molding apparatus 10, for example, injection by the respective injection units 100, 200, 300, and 400 can be performed using various materials such as a material having thermoplasticity, a metal material, and a ceramic material as a main material. Here, the "main material" means a centered material that forms the shape of the molded product or the molded intermediate product, and means a material having a content of 50% by weight or more in the molded product or the molded intermediate product. The above-described molding material includes a material obtained by melting the main material alone or a material obtained by melting and pasting some components together with the main material.

When the thermoplastic material is used as the main material, in the material generating unit 220, the molding material is generated by plasticizing the corresponding material. The "plasticizing" means that heat is applied to the thermoplastic material to melt the thermoplastic material.

For example, the thermoplastic resin material obtained by combining one or more materials selected from the following list can be used as the thermoplastic material.

Example of Thermoplastic Resin Material

General-purpose engineering plastics such as polypropylene (PP) resin, polyethylene (PE) resin, polyacetal (POM) resin, polyvinyl chloride (PVC) resin, polyamide (PA) resin, acrylonitrile butadiene styrene (ABS) resin, polylactic acid (PLA) resin, polyphenylene sulfide (PPS) resin, polyetheretherketone (PEEK), polycarbonate terephthalate, and polyethylene terephthalate, and engineering plastics such as polysulfone, polyether sulfone, polyphenylene sulfide, polyarylate, polyimide, polyamide imide, polyether imide, and polyether ether ketone.

The thermoplastic material may be mixed with pigment, metal, ceramic, and the like. Further, additives such as waxes, flame retardants, antioxidants, and heat stabilizer may be mixed. Further, fibers such as carbon fiber, glass fiber, cellulose fiber, and aramid fiber may be mixed.

It is preferable that the thermoplastic material is injected from each nozzle while being melted completely by being heated above the glass transition point. For example, ABS resin having a glass transition point of 120° C. is injected at about 200° C.

In the injection molding apparatus 10, instead of the above-described thermoplastic material, for example, the following metal material may be used as a main material. In this case, it is preferable that a component melted when the molding material is produced is mixed with a powder material obtained by powdering the following metal material and the mixture is supplied to the material generating unit 220.

Example of Metal Material

Single metals such as magnesium (Mg), iron (Fe), cobalt (Co) or chromium (Cr), aluminum (Al), titanium (Ti), copper (Cu), and nickel (Ni) or alloys containing one or more of these metals.

Example of Alloy

Maraging steel, stainless steel, cobalt chromium molybdenum, titanium alloy, nickel alloy, aluminum alloy, cobalt alloy, and cobalt chromium alloy.

In the injection molding apparatus 10, instead of the above-described metal material, ceramic materials can be used as the main material. For example, oxide ceramics such as silicon dioxide, titanium dioxide, aluminum oxide, and zirconium oxide, and non-oxide ceramics such as aluminum nitride may be used as a ceramic material.

The powder material of the metal material or the ceramic material supplied to the material generating unit 220 may be a mixed material obtained by mixing a plurality of types of powders such as single metal powder, alloy powder, and ceramic powder. Further, the powder material of the metal material or the ceramic material may be coated with, for example, the above-described thermoplastic resins or other thermoplastic resins. In this case, in the material generating unit 220, the thermoplastic resin may be melted to exhibit the fluidity.

For example, the following solvent can be added to the powder material of the metal material or the ceramic material supplied to the material generating unit 220. A combination of one or more selected from the following chemical substances can be used as the solvent.

Examples of Solvent water; (poly) alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkyl ammonium acetates; sulfoxide solvents such as dimethyl sulfoxide and diethyl sulfoxide; pyridine solvents such as pyridine, γ-picoline, and 2,6-lutidine; tetraalkyl ammonium acetate (for example, tetrabutyl ammonium acetate, and the like); and ionic liquids such as butyl carbitol acetate.

In addition, a binder, which will be described below, can be added to the powder material of the metal material or the ceramic material supplied to the material generating unit 220.

Examples of Binder

Acrylic resin, epoxy resin, silicone resin, cellulose resin or other synthetic resin or PLA (polylactic acid), PA (polyamide), PPS (polyphenylene sulfide), PEEK (polyether ether ketone) or other thermoplastic resin.

Figure 11:
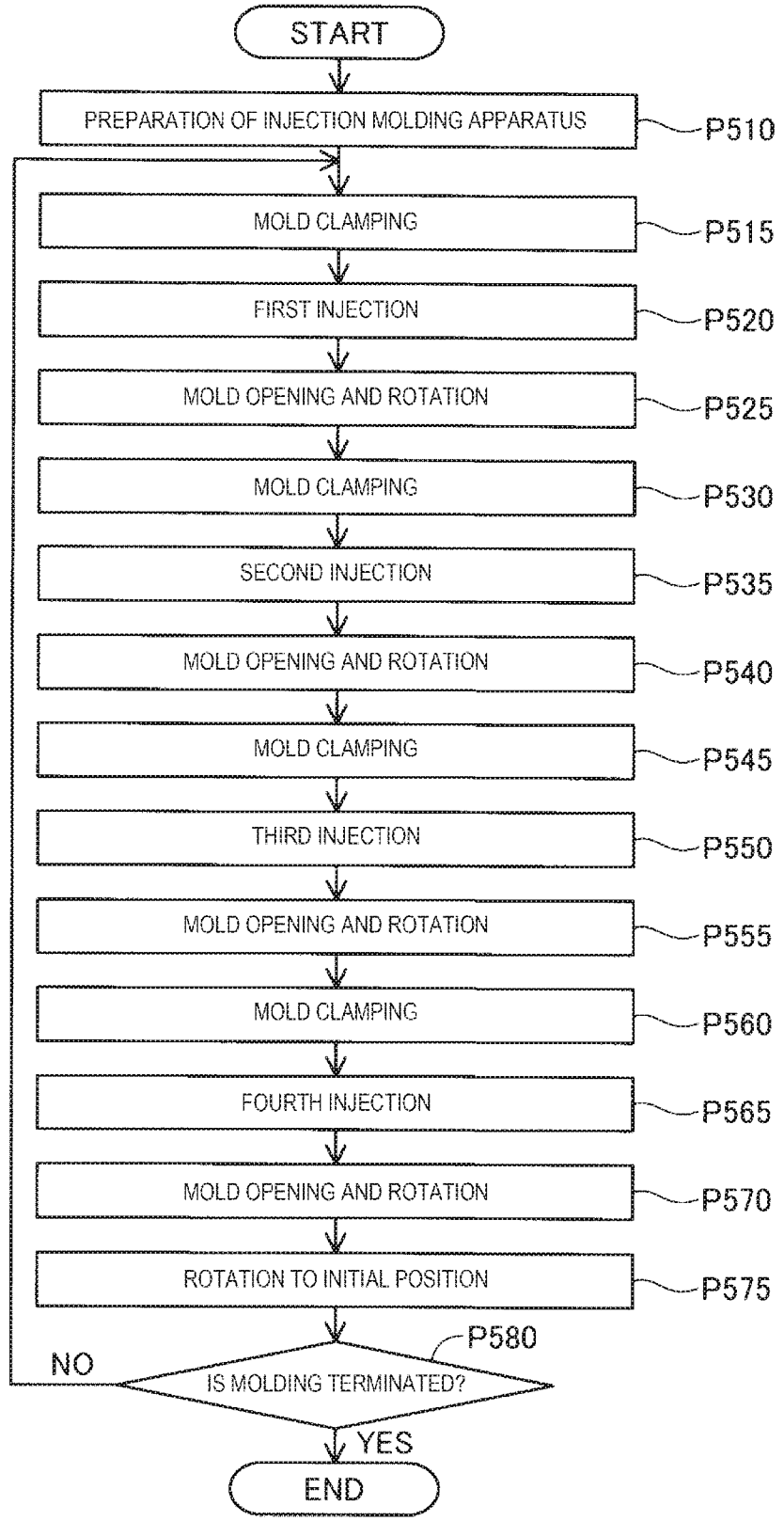
FIG. 11 is a flowchart showing a procedure of an injection molding method.

A-3. Injection Molding Method:

FIG. 11 is a flowchart showing a procedure of the injection molding method. The injection molding apparatus 10 having such a configuration is prepared (step P510). In step P510, the injection molding apparatus 10 is in a state in which the refrigerant flows in a refrigerant flow channel of the upper mold 60 and the lower mold 70. Further, in step P510, the injection molding apparatus 10 is in the mold opened state.

Figure 12:
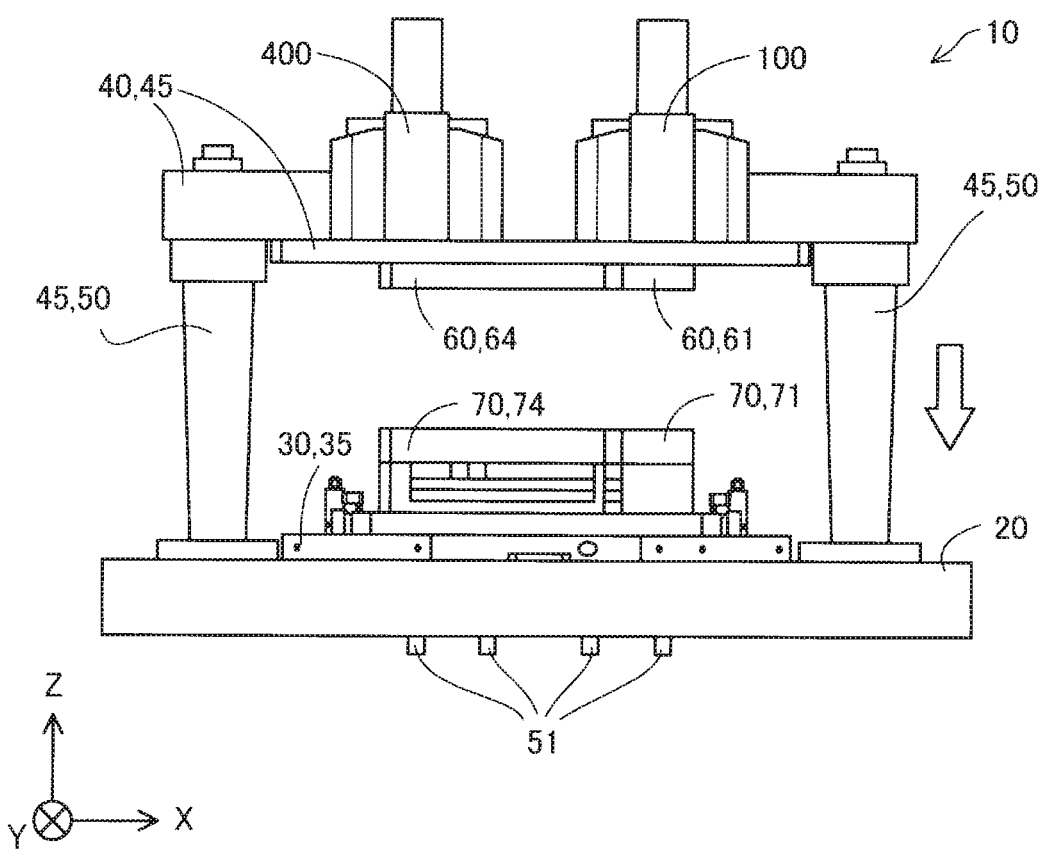
FIG. 12 is a front view showing the injection molding apparatus in a mold opened state.

FIG. 12 is a front view showing the injection molding apparatus 10 in the mold opened state. In the mold opened state, as the movable plate 40 is located on the vertically upper side within a movable range, the upper mold 60 and the lower mold 70 are separated from each other. As illustrated in FIG. 11, the controller 90 controls the mold opening and closing motor to execute the mold clamping (step P515).

Figure 13:
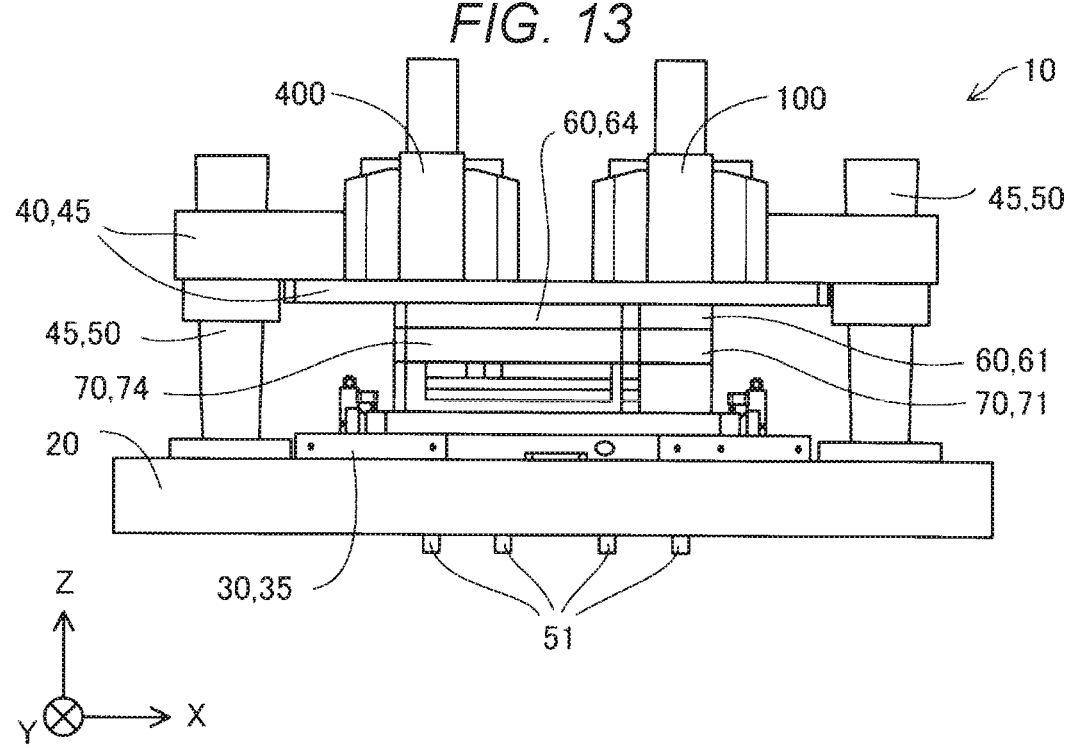
FIG. 13 is a front view showing the injection molding apparatus in a mold clamped state.

FIG. 13 is a front view showing the injection molding apparatus 10 in the mold clamped state. As the movable plate 40 moves in a direction of a white arrow shown in FIG. 12, that is, in a vertically downward direction, the upper mold 60 and the lower mold 70 come into contact with each other and are clamped as shown in FIG. 13. In step P515, as initial positions, the first lower mold 71 and the first upper mold 61, the second lower mold 72 and the second upper mold 62, the third lower mold 73 and the third upper mold 63, and the fourth lower mold 74 and the fourth upper mold 64 face each other and are clamped.

As illustrated in FIG. 11, the controller 90 controls the first injection unit 100 to execute the first injection (step P520). Accordingly, the first molding material is injected from the first nozzle 150 of the first injection unit 100 to the first cavity C1 formed between the first upper mold 61 and the first lower mold 71.

Figure 14:
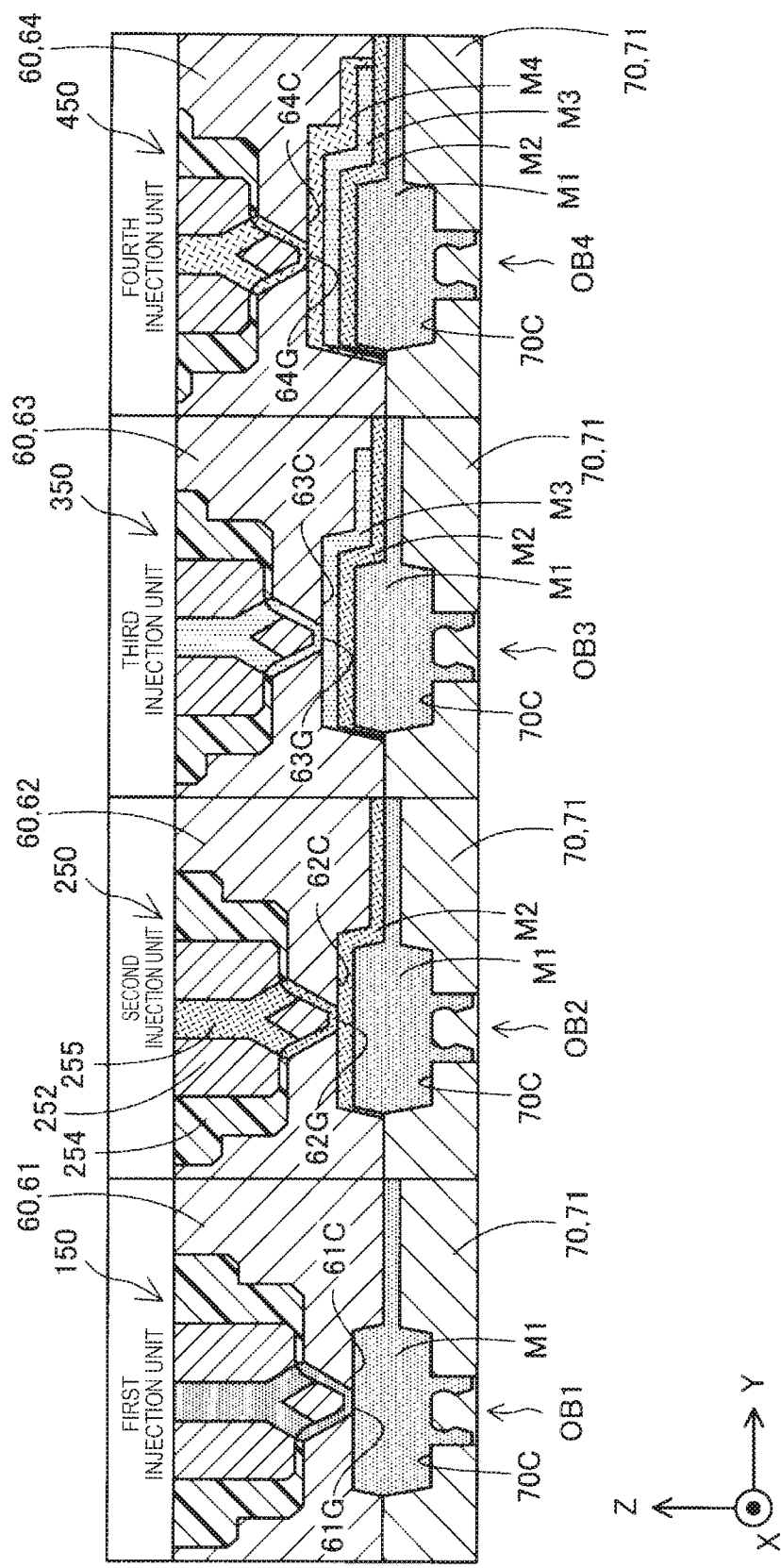
FIG. 14 is an explanatory view for illustrating a state in which a molding material is injected by each injection.

FIG. 14 is a diagram for illustrating a state in which a molding material is injected by each injection. The cross section similar to FIG. 10 is shown in FIG. 14. A predetermined amount of the first molding material M1 is filled in the first cavity C1 formed between the first upper mold 61 and the first lower mold 71 by the first injection, so that a first molding intermediate product OB1 is formed. A pressure holding step of replenishing the first molding material M1 into the first cavity C1 may be included in step P520 shown in FIG. 11. Further, a cooling step of cooling and hardening the filled first molding material M1 is included in step P520. The cooling step is performed by maintaining the mold clamped state during a predetermined time.

The controller 90 controls the mold opening and closing motor to execute the mold opening, and controls the rotary plate motor to execute rotation of the rotary plate 40 (step P525).

Figure 15:
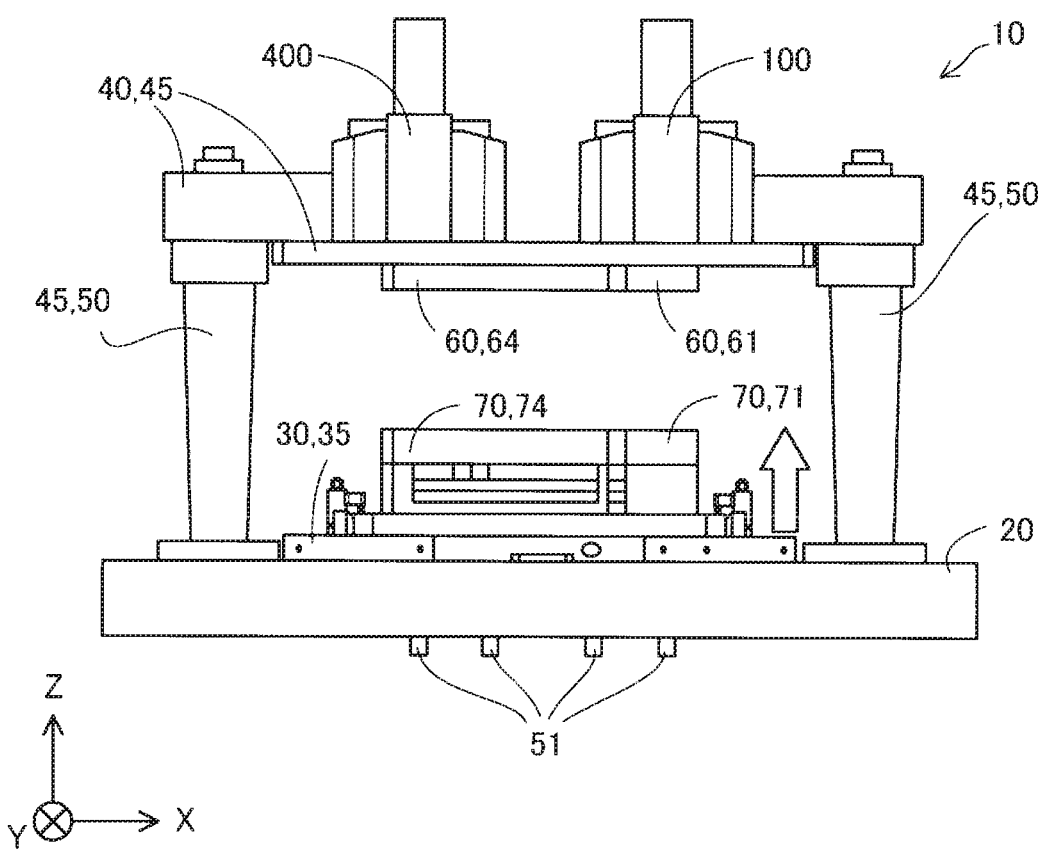
FIG. 15 is a front view showing the injection molding apparatus during execution of step P525.
Figure 16:
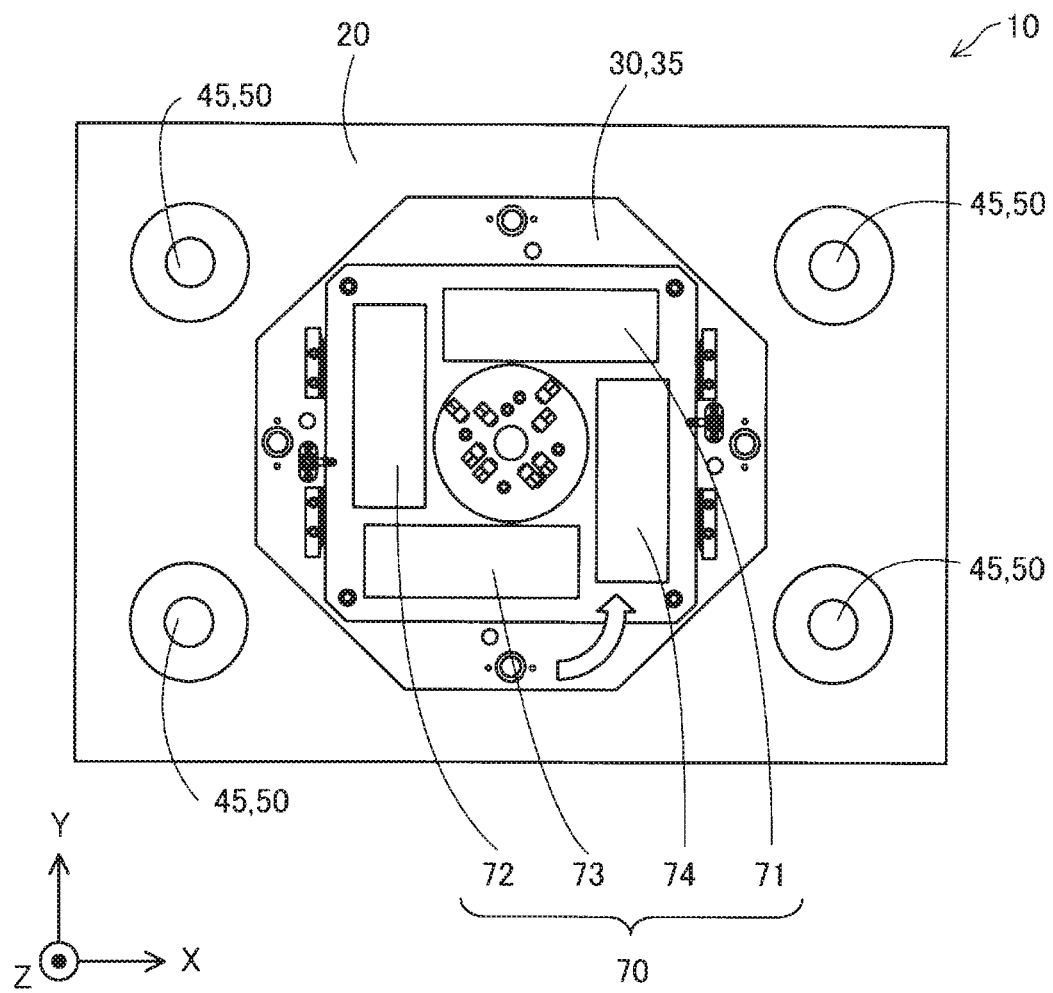
FIG. 16 is a top view showing a rotary plate after completion of step P525.

FIG. 15 is a front view showing the injection molding apparatus 10 during execution of step P525. FIG. 16 is a top view showing a rotary plate 30 after completion of step P525. In step P525, after moving the movable plate 40 in a vertically upward direction, the controller 90 slightly lifts up the rotary plate 30 in a direction indicated by a white arrow in FIG. 15, that is, in the vertically upward direction. Thereafter, the controller 90 rotates the rotary plate 30 by 90° in a direction indicated by a white arrow of FIG. 16 to cause the upper mold 60 and the lower mold 70 to selectively face each other, and then to release the lifting of the rotary plate 30. Accordingly, the first lower mold 71 and the second upper mold 62, the second lower mold 72 and the third upper mold 63, the third lower mold 73 and the fourth upper mold 64, and the fourth lower mold 74 and the first upper mold 61 face each other. However, the first lower mold 71 in a state of holding the first molding intermediate product OB1 faces the second upper mold 62.

As illustrated in FIG. 11, the controller 90 controls the mold opening and closing motor to execute the mold clamping (step P530). The controller 90 controls the second injection unit 200 to execute the second injection (step P535). Accordingly, as illustrated in FIG. 14, a predetermined amount of the second molding material M2 is injected from the second nozzle 250 of the second injection unit 200. The injected second molding material M2 is filled between the second upper mold 62 and the first lower mold 71 in a state of holding the first molding intermediate product OB1, to form a second molding intermediate product OB2. Step P535 shown in FIG. 11 may include a pressure holding process and a cooling process.

The controller 90 controls the mold opening and closing motor to execute the mold opening, and controls the rotary plate motor to execute rotation of the rotary plate 30 (step P540). Step P540 is performed in the same manner as step P525. Accordingly, the first lower mold 71 and the third upper mold 63, the second lower mold 72 and the fourth upper mold 64, the third lower mold 73 and the first upper mold 61, and the fourth lower mold 74 and the second upper mold 62 face each other. However, the first lower mold 71 in a state of holding the second molding intermediate product OB2 faces the third upper mold 63.

The controller 90 controls the mold opening and closing motor to execute the mold clamping (step P545). The controller 90 controls the third injection unit 300 to execute the third injection (step P550). Accordingly, as illustrated in FIG. 14, a predetermined amount of the third molding material M3 is injected from the third nozzle 350 of the third injection unit 300. The injected third molding material M3 is filled between the third upper mold 63 and the first lower mold 71 in a state of holding the second molding intermediate product OB2, to form a third molding intermediate product OB3. Step P550 shown in FIG. 11 may include a pressure holding process and a cooling process.

The controller 90 controls the mold opening and closing motor to execute the mold opening, and controls the rotary plate motor to execute rotation of the rotary plate 30 (step P555). Step P555 is performed in the same manner as step P525. Accordingly, the first lower mold 71 and the fourth upper mold 64, the second lower mold 72 and the first upper mold 61, the third lower mold 73 and the second upper mold 62, and the fourth lower mold 74 and the third upper mold 63 face each other. However, the first lower mold 71 in a state of holding the third molding intermediate product OB3 faces the fourth upper mold 64.

The controller 90 controls the mold opening and closing motor to execute the mold clamping (step P560). The controller 90 controls the fourth injection unit 400 to execute the fourth injection (step P565). Accordingly, as illustrated in FIG. 14, a predetermined amount of the fourth molding material M4 is injected from the fourth nozzle 450 of the fourth injection unit 400. The injected fourth molding material M4 is filled between the fourth upper mold 64 and the first lower mold 71 in a state of holding the third molding intermediate product OB3, to form a molded product OB4. Step P565 shown in FIG. 11 may include a pressure holding process and a cooling process.

The controller 90 controls the mold opening and closing motor to execute the mold opening, to release the molded product OB4 (step P570). In step P570, after moving the movable plate 40 in the vertically upward direction, the controller 90 moves the extrusion pins 51 at a position corresponding to the first lower mold 71 in the vertically upward direction so that the extrusion pins 51 reach the lower mold cavity 70C. The controller 90 extrudes and releases the molded product OB4.

The controller 90 controls the rotary plate motor to rotate the rotary plate 30 in an initial position (step P575). Step P575 is performed in the same manner as step P525. Accordingly, the first lower mold 71 and the first upper mold 61, the second lower mold 72 and the second upper mold 62, the third lower mold 73 and the third upper mold 63, and the fourth lower mold 74 and the fourth upper mold 64 face each other.

The controller 90 determines whether or not the molding is completed (step P580). Whether or not the molding is completed may be determined based on whether or not the molding for the predetermined number of cycles is completed or may be determined based on whether or not the user presses a termination button for terminating the injection molding. When it is determined that the molding is not completed (step P580: NO), the process returns to step P515 to perform the next cycle of molding. When it is determined that the molding is completed (step P580: YES), the injection molding is completed.

The injection molding apparatus 10 according to the present embodiment has four lower molds 71, 72, 73, and 74 as the lower mold 70. Therefore, the first injection (step P520), the second injection (step P535), the third injection (step P550), and the fourth injection (step P565) can be executed at the same time. For example, in the fourth injection (step P565), while the fourth molding material M4 is injected between the fourth upper mold 64 and the first lower mold 71 in a state of holding the third molding intermediate product OB3 to form the molded product OB4, the first injection (step P520), the second injection (step P535), and the third injection (step P550) may be executed. Accordingly, for example, the first molding material M1 may be injected between the first upper mold 61 and the second lower mold 72 from the first injection unit 100 to form the first molding intermediate product OB1. Further, for example, the second molding material M2 may be injected between the second upper mold 62 and the third lower mold 73 in a state of holding the first molding intermediate product OB1 from the second injection unit 200 to form the second molding intermediate product OB2. Further, for example, the third molding material M3 is injected between the third upper mold 63 and the fourth lower mold 74 in a state of holding the second molding intermediate product OB2 from the third injection unit 300 to form the third molding intermediate product OB3.

According to the above-described injection molding apparatus 10 according to the present embodiment, the fourth gate opening 64G is formed at a position separated further from the lower mold 70 than the third gate opening 63G, the third gate opening 63G is formed at a position separated further from the lower mold 70 than the second gate opening 62G, and the second gate opening 62G is formed at a position separated further from the lower mold 70 than the first gate opening 61G. Further, the fourth nozzle 450 is located on a side separated further from the lower mold 70 than the third nozzle 350, the third nozzle 350 is located on a side separated further from the lower mold 70 than the second nozzle 250, and the second nozzle 250 is located on a side separated further from the lower mold 70 than the first nozzle 150. Further, the fourth cavity C4 has a larger volume than the third cavity C3, the third cavity C3 has a larger volume than the second cavity C2, and the second cavity C2 has a larger volume than the first cavity C1. Therefore, the subsequent injection can be performed on a side separated further from the lower mold 70 than the previous injection, in other words, upstream of the previous injection in the injection direction D. However, it is possible to suppress narrowing of the flow channels of the gate openings 62G, 63G, and 64G, into which the molding materials M2, M3, and M4 of the subsequent injection flow, due to the molding materials M1, M2, and M3 injected by the previous injection, and it is possible to suppress occurrence of poor filling of the molding materials M2, M3, and M4 in the subsequent injection. That is, it is possible to suppress the occurrence of the poor filling after second and subsequent colors in multi-color molding using different materials.

Further, since the subsequent injection can be performed upstream of the previous injection in the injection direction D, under influence of a gate fragment state in the previous injection, it is possible to suppress changes of the shapes of the flow channels of the gate openings 62G, 63G, and 64G in the subsequent injection, and it is possible to suppress the occurrence of the poor filling of the molding materials M2, M3, and M4 in the subsequent injection. However, it is possible to suppress a reduction in a yield rate of the molded product OB4, and it is possible to suppress an increase in costs required for manufacturing the molded product OB4 by multi-color molding.

Further, since the injection directions D of the injection units 100, 200, 300, and 400 are parallel to each other, as compared to a configuration in which the molding materials M1, M2, M3, and M4 are injected from different injection directions D, it is possible to suppress an increase in the size of the injection molding apparatus 10, and it is possible to suppress complication of a molding structure of the upper mold 60.

Further, since the lower molds 71, 72, 73, and 74 face the gate openings 61G, 62G, 63G, and 64G in the facing positions P, respectively, the positions of gates for the molded product OB4 and the molded intermediate products OB1, OB2, and OB3 may be the same in multi-color molding injection. Therefore, it is possible to omit changes in the positions of the gate openings 61G, 62G, 63G, and 64G according to types of the molded product OB4 molded using the multi-color molding, and it is possible to suppress the complication of the mold structure of the upper mold 60. However, it is possible to generalize at least a part of the mold structure of the upper mold 60 according to types of the molded product OB4, and it is possible to suppress an increase in the number of steps required for designing the upper mold 60.

Further, since the nozzles 150, 250, 350, and 450 are configured by hot runners, respectively, as compared to a configuration of a so-called cold runner, it is possible to suppress attachment of the runners formed of the molding materials M1, M2, M3, and M4 to the molded product OB4 and the molded intermediate products OB1, OB2, and OB3. Therefore, it is possible to reduce the amounts of the molding materials M1, M2, M3, and M4 used. Further, since a step of removing the runner can be omitted, it is possible to shorten a cycle time required for the multi-color molding. Further, even in a configuration in which the facing positions P where the lower mold 70 faces the gate openings 61G, 62G, 63G, and 64G are all the same, since it is possible to suppress formation of the runner, it is possible to suppress narrowing of the flow channels by blocking parts of the gate openings 62G, 63G, and 64G in the subsequent injection by the runner.

Further, since there are four lower molds 71, 72, 73, and 74 as the lower mold 70, it is possible to execute the first injection, the second injection, the third injection, and the fourth injection at the same time, and it is possible to shorten the cycle time required for the multi-color molding. Further, since the lower mold 70 is caused to selectively face the upper mold 60 by rotating the rotary plate 30 on which the lower mold 70 is disposed, as compared to a configuration in which the lower mold is caused to selectively face the upper mold by linearly moving the lower mold, it is possible to suppress an increase in the size of the injection molding apparatus 10. Therefore, since an operation of returning the facing position where the upper mold 60 and the lower mold 70 face each other to an initial position can be omitted after all injections from the first injection to the fourth injection are completed in the entire lower mold 70, it is possible to perform continuous injection, and it is possible to shorten the cycle time required for the multi-color molding.

Further, as the rotary plate 30 on which the lower mold 70 is disposed rotates, a relative position between the upper mold 60 and the lower mold 70 is changed in a direction intersecting the injection direction D, so that the lower mold 70 selectively faces the upper mold 60. Therefore, an operation of rotating the relatively heavy injection units 100, 200, 300, and 400 together with the upper mold 60 can be omitted, energy required for the rotation of the rotary plate 30 can be suppressed, and the increase in the size and the complexity of the injection molding apparatus 10 can be suppressed. Further, as the movable plate 40 on which the upper mold 60 is disposed moves along the injection direction D, the relative position between the upper mold 60 and the lower mold 70 is changed in the injection direction D so that the upper mold 60 and the lower mold 70 are clamped. Thus, it is possible to suppress the increase in the size and the complexity of the injection molding apparatus 10.

Further, since the material is melted by rotation of the flat screw 224 to form the molding materials M1, M2, M3, and M4, it is possible to miniaturize a mechanism for producing the molding materials M1, M2, M3, and M4. Therefore, it is possible to suppress an increase in the size of each injection unit 100, 200, 300, and 400, and thus it is possible to suppress the increase in the size of the injection molding apparatus 10. Further, since it is possible to suppress the increase in the size of the injection units 100, 200, 300, and 400, the injection units 200, 300, and 400 used for the subsequent injection can be easily located upstream of the injection units 100, 200, and 300 used for the previous injection in the injection direction D, in other words, on a side separated from the lower mold 70. Therefore, the nozzles 250, 350, and 450 used for the subsequent injection can be easily located upstream of the nozzles 150, 250, and 350 used for the previous injection in the injection direction D, in other words, on a side separated from the lower mold 70. However, the present disclosure can be also suitably applied to an injection molding apparatus that execute multi-color molding using five or more colors.

B. Comparative Example

Figure 17:
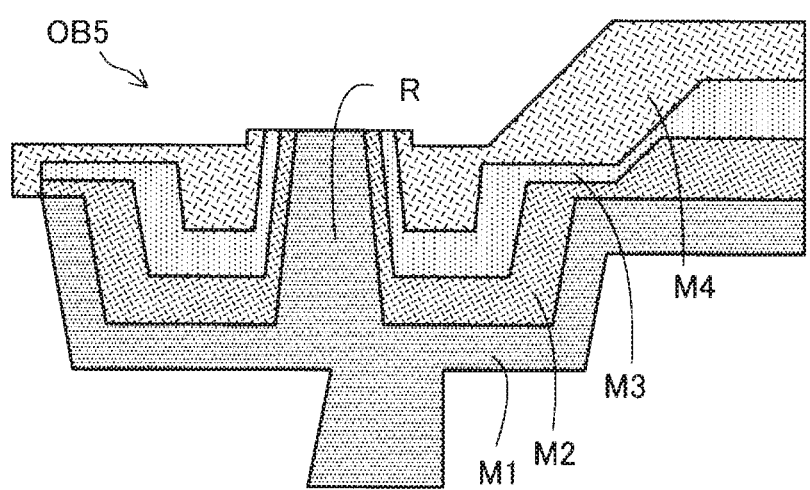
FIG. 17 is a sectional view showing a molded product formed using an injection molding apparatus according to a comparative example.

FIG. 17 is a sectional view showing a molded product OB5 formed using an injection molding apparatus according to a comparative example. In four injection units of the injection molding apparatus according to the comparative example, the positions of four upper molds along the injection direction D of gate openings are substantially the same. Further, the positions of nozzles along the injection direction D are substantially the same. Further, when lower molds and upper molds selectively face each other, the positions of the lower molds corresponding to the gate openings are substantially the same. Further, the area of the gate openings formed in the upper molds used for the subsequent injection is larger than the area of the gate openings formed in the lower molds used for the previous injection.

When the multi-color molding is performed using the injection molding apparatus according to the comparative example, a runner R is formed at a position corresponding to the gate opening by the first molding material M1 in the first injection. Therefore, a flow channel of the gate opening in which the second molding material M2 flows in the second injection is narrowed due to the runner R. However, poor filling of the second molding material M2 in the second injection may occur. Similarly, the flow channel of the gate opening in which the third molding material M3 flows in the third injection may be narrowed, and thus the poor filling may occur. Further, the flow channel of the gate opening in which the four molding material M4 flows in the fourth injection may be narrowed, and thus the poor filling may occur. Further, under the influence of the gate fragment state in the previous injection, the shape of the flow channel of the gate opening in the subsequent injection is changed, and the poor filling may occur. However, according to the injection molding apparatus according to the comparative example, a yield rate of the molded product OB5 is reduced, and costs consumed for manufacturing the molded product OB5 by the multi-color molding increases.

In contrast, according to the injection molding apparatus 10 according to the present embodiment, the subsequent injection can be performed upstream of the previous injection in the injection direction D. Therefore, it is possible to suppress narrowing of flow channels of the gate openings 62G, 63G, and 64G in which the molding materials M2, M3, and M4 in the subsequent injection flow, by the molding materials M1, M2, and M3 injected in the previous injection. However, it is possible to suppress the occurrence of the poor filling of the molding materials M2, M3, and M4 in the subsequent injection.

C. Another Embodiment (C1) The areas of the gate openings 61G, 62G, 63G, and 64G are the same in the embodiment, but may be different from each other. For example, the areas of the gate openings 62G, 63G, and 64G formed in the upper molds 62, 63, and 64 used for the subsequent injection may be larger than the areas of the gate openings 61G, 62G, and 63G formed in the lower molds 71, 72, and 73 used for the previous injection. In more detail, the area of the second gate opening 62G may be larger than the area of the first gate opening 61G, the area of the third gate opening 63G may be larger than the area of the second gate opening 62G, and the area of the fourth gate opening 64G may be larger than the area of the third gate opening 63G. The areas of the gate openings 61G, 62G, 63G, and 64G mean the area of the plane that is perpendicular to the injection direction D. According to such a configuration, it is possible to further suppress narrowing of the flow channels of the gate openings 62G, 63G, and 64G, into which the molding materials M2, M3, and M4 of the subsequent injection flow, due to the molding materials M1, M2, and M3 injected by the previous injection, and it is possible to further suppress the occurrence of the poor filling of the molding materials M2, M3, and M4 in the subsequent injection.

(C2) In the above embodiment, although the positions of the nozzles 150, 250, 350, and 450 along the injection direction D are adjusted by using the spacers S having different thicknesses, the present disclosure is not limited thereto. For example, the positions may be adjusted by overlapping the plurality of spacers S of about 1 mm, and the positions may be adjusted by using not only the spacers S but also any other member. Further, a difference between the positions of the nozzles 250, 350, and 450 used for the subsequent injection and the positions of nozzles 150, 250, and 350 used for the previous injection is not limited to about 1 mm, and may be 0.5 mm, 2 mm, or the like. The nozzles 250, 350, and 450 used for the subsequent injection are located upstream of the nozzles 150, 250, and 350 used for the previous injection. Even in this configuration, the same effects as those according to the above embodiments are obtained.

(C3) In the above embodiment, the nozzles 150, 250, 350, and 450 are configured with hot runners, respectively. However, areas where the molding materials M1, M2, M3, and M4 are not heated may exist in at least parts of the nozzles 150, 250, 350, and 450 along the injection direction D. Further, the heaters 257 embedded in the nozzles 150, 250, 350, and 450 may be different from each other according to an embedded position, the types of a heater, and the like. Further, the upper mold 60 and the lower mold 70 according to the embodiment are configured with disposable molds, but may be configured with reusable molds. Even in this configuration, the same effects as those according to the above embodiments are obtained.

(C4) In the above embodiment, the lower mold 70 has four lower molds 71, 72, 73, and 74, the number of which is equal to the number of the upper molds 60. However, the number of the lower molds 70 is not limited to the number of the upper molds 60, and may be larger than the number of the upper molds 60 or may be smaller than the number of the upper molds 60. Even in this configuration, the same effects as those according to the above embodiments are obtained.

(C5) In the above embodiment, the position changing mechanism 35 changes a relative position between the upper mold 60 and the lower mold 70 in a direction intersecting the injection direction D by rotating the rotary plate 30 on which the lower mold 70 is disposed, and the mold clamping mechanism 45 changes the relative position between the upper mold 60 and the lower mold 70 in the injection direction D by moving the movable plate 40 on which the upper mold 60 is disposed along the injection direction D to perform the mold clamping. However, the present disclosure is not limited thereto. For example, the lower mold 70 is disposed on a base that slides instead of rotating, and the lower mold 70 and the upper mold 60 may selectively face each other by linearly moving the base. Further, for example, as a rotary stand is disposed on the movable plate 40 side, and the upper mold 60 and the injection units 100, 200, 300, and 400 are rotated, the fixedly disposed lower mold 70 may selectively face the upper mold 60. Further, for example, the lower mold 70 may be disposed on a movable stand, and the mold clamping may be performed by moving such a movable stand along the injection direction D. That is, in general, a relative position between a first upstream mold or a second upstream mold and a downstream mold may be changed in a direction intersecting the injection direction, and the position changing mechanism facing the downstream mold may be provided in the first upstream mold or the second upstream mold. Further, the position changing mechanism may include a rotary plate which has a rotational axis that is parallel to the injection direction and on which the downstream mold is disposed, and may be configured to rotate the rotary plate about the rotational axis. Further, the relative position between the first upstream mold or the second upstream mold and the downstream mold may be changed in the injection direction, and the mold clamping mechanism for performing the mold clamping between the first upstream mold or the second upstream mold and the downstream mold may be provided. Further, the mold clamping mechanism may have a movable plate on which the first upstream mold and the second upstream mold are disposed, and may move the movable plate along the injection direction. Even in this configuration, the same effects as those according to the above embodiments are obtained.

(C6) Although the injection molding apparatus 10 according to the above embodiment includes the injection units 100, 200, 300, and 400 each having the flat screw 224 in the material generating unit 220, the present disclosure is not limited thereto. For example, the present disclosure is not limited to the flat screw 224, and the material may be melted by a screw cylinder that is long along the axial line AX. Even in this configuration, the same effects as those according to the above embodiments are obtained.

(C7) Although the injection molding apparatus 10 according to the above embodiment includes four injection units 100, 200, 300, and 400 having the same configuration, the injection molding apparatus may include a plurality of injection units having different configurations. Even in this configuration, the same effects as those according to the above embodiments are obtained.

(C8) In the above embodiment, the four injection units 100, 200, 300, and 400 and four sets of upper molds 60 and lower molds 70 are provided. However, the present disclosure is not limited thereto. These numbers are not limited to four and may be any plural numbers such as two and five. That is, the present disclosure is not limited to four color molding, and may be applied to the injection molding apparatus for performing the multi-color molding using the predetermined number of colors, such as two-color molding and five-color molding.

(C9) The injection molding apparatus 10 according to the embodiment is a so-called vertical injection molding apparatus 10 in which the injection direction D coincides with the vertically downward direction and the movable plate 40 moves along the vertical direction. Further, the present disclosure may be applied to a horizontal injection molding apparatus which performs the mold clamping by moving the movable plate 40 in a direction that is perpendicular to the vertical direction.

(C10) In the above embodiment, some or the entirety of functions and processes implemented by software may be also implemented by hardware. Further, some or the entirety of functions and processes implemented by the hardware may be implemented by the software. For example, various circuits such as an integrated circuit, a discrete circuit, and a circuit module obtained by combining these circuits may be used as the hardware.

D. Another Embodiment

The present disclosure is not limited to the above-described embodiment, and can be realized in various forms without departing from the gist thereof. For example, the present disclosure can also be realized by the following aspects. Technical features in the above embodiments corresponding to technical features in each embodiment described below may be appropriately replaced or combined in order to solve some or all of the problems of the present disclosure or achieve some or all of the effects of the present disclosure. Further, unless these technical features are described as essential in the specification, the technical features may be appropriately deleted.

(1) An aspect of the present disclosure is to provide an injection molding apparatus.

There is provided an injection molding apparatus configured to perform molding using different materials, the apparatus including a first upstream mold having a first gate opening formed therein into which a first molding material flows, a second upstream mold having a second gate opening formed therein into which a second molding material flows, a first injection unit that injects the first molding material through the first gate opening, a second injection unit that injects the second molding material through the second gate opening, and a downstream mold configured to be clamped with each of the first upstream mold and the second upstream mold, in which the second molding material is injected by the second injection unit after the first molding material is injected by the first injection unit, the second gate opening is formed at a position separated further from the downstream mold than the first gate opening, and a volume of a second cavity partitioned by the second upstream mold and the downstream mold in a mold clamped state is larger than a volume of a first cavity partitioned by the first upstream mold and the downstream mold in the mold clamped state. According to the injection molding apparatus of this aspect, the second material is injected by the second injection unit after the first molding material is injected by the first injection unit, and the second gate opening is formed at a position separated further away from the downstream mold than the first gate opening. Therefore, the subsequent injection can be performed upstream of the previous injection in the injection direction. However, it is possible to suppress narrowing of a flow channel of a gate opening, into which the molding material of the subsequent injection flows, by the molding material injected by the previous injection, and it is possible to suppress occurrence of the poor filling of the molding material in the subsequent injection. That is, it is possible to suppress the occurrence of the poor filling after second and subsequent colors in multi-color molding using different materials.

(2) In the injection molding apparatus of the above aspect, a position facing the first gate opening when the downstream mold is clamped with the first upstream mold and a position facing the second gate opening when the downstream mold is clamped with the second upstream mold may be equal to each other. In the injection molding apparatus of the above aspect, in the downstream mold, a position facing the first gate opening when clamped with the first upstream mold and a position facing the second gate opening when clamped with the second upstream mold may be equal to each other. Thus, the position of a gate in a molded product or a molded intermediate product can be the same in each injection of multi-color molding. Therefore, it is possible to omit changing of the position of a gate opening for each type of a molded product molded using the multi-color molding, and it is possible to suppress complication of the mold structure of a plurality of upstream molds. However, it is possible to generalize at least a part of the mold structure of the upstream mold, and it is possible to suppress an increase in the number of man hours required for designing the upstream mold.

(3) In the injection molding apparatus of the above aspect, the first injection unit may include a first nozzle disposed inside the first upstream mold to guide the first molding material to the first gate opening, the second injection unit may include a second nozzle disposed inside the second upstream mold to guide the second molding material to the second gate opening, the first nozzle may have a first heater that heats the first molding material, and the second nozzle may have a second heater that heats the second molding material. According to the injection molding apparatus of this aspect, the first nozzle may have a first heater that heats the first molding material, and the second nozzle may have a second heater that heats the second molding material. Therefore, in a state in which the molding materials are heated, the molding materials can be injected from the nozzles, respectively. Therefore, since it is possible to suppress association of a runner formed of each molding material with the molded product or the molded intermediate product, the amount of each molding material used can be reduced. Further, since a step of removing the runner can be omitted, it is possible to shorten a cycle time required for the multi-color molding. Further, even in a configuration in which a position facing the first gate opening when the downstream mold is clamped with the first upstream mold and a position facing the second gate opening when the downstream mold is clamped with the second upstream mold are equal to each other, since it is possible to suppress formation of the runner, it is possible to suppress narrowing of a flow channel by blocking a part of the gate opening in the subsequent injection by such a runner.

(4) In the injection molding apparatus of the above aspect, the downstream mold may include a first downstream mold and a second downstream mold configured to be clamped with the first upstream mold and the second upstream mold, respectively. According to the injection molding apparatus of this aspect, since the downstream mold is configured to be clamped with the first upstream mold or the second upstream mold, and includes a first downstream mold and a second downstream mold, injection can be performed by the first injection unit while injection is performed by the second injection unit, and a cycle time required for multi-color molding can be shortened.

(5) In the injection molding apparatus of the above aspect, the injection molding apparatus further includes a position changing mechanism that changes a relative position between the first upstream mold or the second upstream mold and the downstream mold in a direction intersecting an injection direction in which the first molding material or the second molding material is injected and causes the downstream mold to face the first upstream mold or the second upstream mold, in which the position changing mechanism may include a rotary plate which has a rotational axis that is parallel to the injection direction and on which the downstream mold is disposed, and may rotate the rotary plate about the rotational axis. According to the injection molding apparatus of this aspect, since the downstream mold faces the first upstream mold or the second upstream mold by rotating the rotary plate on which the downstream mold is disposed, it is possible to suppress an increase in the size of the injection molding apparatus, as compared to a configuration in which the downstream mold is linearly moved to selectively face a plurality of upstream molds. Further, in a configuration in which the downstream mold includes a first downstream mold and a second downstream mold configured to be clamped with the first upstream mold and the second upstream mold, respectively, as compared to a configuration in which the first upstream mold and the second upstream mold face each other by linearly moving the first downstream mold and the second downstream mold, an operation of returning an opposing position of the upstream mold and the downstream mold to an initial position can be omitted. Thus, the injection can be performed continuously, and a cycle time required for the multi-color molding can be shortened. Further, as the rotary plate on which the first upstream mold, the second upstream mold, the first injection unit, and the second injection unit are disposed is rotated, as compared to a configuration in which the first downstream mold and the second downstream mold are opposed to the first upstream mold and the second upstream mold, it is possible to suppress energy required for the rotation of the rotary plate, and it is possible to suppress the increase in the size and the complexity of the injection molding apparatus.

(6) In the injection molding apparatus of the above aspect, the injection molding apparatus further includes a mold clamping mechanism that changes a relative position between the first upstream mold or the second upstream mold and the downstream mold in an injection direction in which the first molding material or the second molding material is injected, and performs mold clamping between the first upstream mold or the second upstream mold and the downstream mold, in which the mold clamping mechanism has a movable plate on which the first upstream mold and the second upstream mold are disposed and moves the movable plate along the injection direction. According to the injection molding apparatus of this aspect, since the mold clamping is performed by moving the movable plate on which the first upstream mold and the second upstream mold are disposed along the injection direction, it is possible to suppress the increase in the size and the complexity of the injection molding apparatus.

(7) In the injection molding apparatus of the above aspect, an area of the second gate opening may be larger than an area of the first gate opening. According to the injection molding apparatus of this aspect, since the area of the second gate opening is larger than the area of the first gate opening, it is possible to further suppress narrowing of the flow channel of the gate opening into which the molding material injected by the subsequent injection flows by the molding material injected by the previous injection, and it is possible to further suppress the occurrence of the poor filling of the molding material in the subsequent injection.

(8) In the injection molding apparatus of the above aspect, the first injection unit may have a first flat screw that melts a material by rotation to produce the first molding material, and the second injection unit may have a second flat screw that melts a material by rotation to produce the second molding material. According to the injection molding apparatus of this aspect, the first injection unit has the first flat screw that melts the material by rotation to produce the first molding material, and the second injection unit has the second flat screw that melts the material by rotation to produce the second molding material. Thus, it is possible to miniaturize a mechanism for generating a molding material. Therefore, it is possible to suppress the increase in the size of each injection unit, and thus it is possible to suppress the increase in the size of the injection molding apparatus. Further, since it is possible to suppress the increase in the size of each injection unit, the second injection unit can be easily located to be separated further from the downstream mold than the first injection unit, and the second nozzle can be easily located to be separated further from the downstream mold than the first nozzle.

The present disclosure can be realized in various forms other than the injection molding apparatus. For example, the present disclosure may be realized in forms such as a multi-color molding apparatus, an injection molding method, a multi-color molding method, a method of controlling the injection molding apparatus, a method of controlling a multi-color molding apparatus, a computer program that realizes such a molding method or a control method, a non-temporary recording medium that records such a computer program, and the like.

What is claimed is:

1. An injection molding apparatus configured to perform molding using different materials, the apparatus comprising:
    a first upstream mold having a first gate opening formed therein into which a first molding material flows;
    a second upstream mold having a second gate opening formed therein into which a second molding material flows;
    a first injection unit that injects the first molding material through the first gate opening;
    a second injection unit that injects the second molding material through the second gate opening; and
    a downstream mold configured to be clamped with each of the first upstream mold and the second upstream mold, wherein
    the second molding material is injected by the second injection unit after the first molding material is injected by the first injection unit,
    the second gate opening is formed at a position separated further from the downstream mold than the first gate opening, and
    a volume of a second cavity partitioned by the second upstream mold and the downstream mold in a mold clamped state is larger than a volume of a first cavity partitioned by the first upstream mold and the downstream mold in the mold clamped state.

2. The injection molding apparatus according to claim 1, wherein
    a position facing the first gate opening when the downstream mold is clamped with the first upstream mold and a position facing the second gate opening when the downstream mold is clamped with the second upstream mold are equal to each other.

3. The injection molding apparatus according to claim 1, wherein
    the first injection unit includes a first nozzle disposed inside the first upstream mold to guide the first molding material to the first gate opening,
    the second injection unit includes a second nozzle disposed inside the second upstream mold to guide the second molding material to the second gate opening,
    the first nozzle has a first heater that heats the first molding material, and
    the second nozzle has a second heater that heats the second molding material.

4. The injection molding apparatus according to claim 1, wherein
    the downstream mold includes a first downstream mold and a second downstream mold configured to be clamped with the first upstream mold and the second upstream mold, respectively.

5. The injection molding apparatus according to claim 1, further comprising:
    a position changing mechanism that changes a relative position between the first upstream mold or the second upstream mold and the downstream mold in a direction intersecting an injection direction in which the first molding material or the second molding material is injected and causes the downstream mold to face the first upstream mold or the second upstream mold, wherein
    the position changing mechanism includes a rotary plate which has a rotational axis that is parallel to the injection direction and on which the downstream mold is disposed, and rotates the rotary plate about the rotational axis.

6. The injection molding apparatus according to claim 1, further comprising:
    a mold clamping mechanism that changes a relative position between the first upstream mold or the second upstream mold and the downstream mold in an injection direction in which the first molding material or the second molding material is injected, and performs mold clamping between the first upstream mold or the second upstream mold and the downstream mold, wherein
    the mold clamping mechanism has a movable plate on which the first upstream mold and the second upstream mold are disposed and moves the movable plate along the injection direction.

7. The injection molding apparatus according to claim 1, wherein
    an area of the second gate opening is larger than an area of the first gate opening.

8. The injection molding apparatus according to claim 1, wherein
    the first injection unit has a first flat screw that melts a material by rotation to produce the first molding material, and
    the second injection unit has a second flat screw that melts a material by rotation to produce the second molding material.

* * * * *